US011770219B2

(12) United States Patent
Abedini et al.

(10) Patent No.: US 11,770,219 B2
(45) Date of Patent: Sep. 26, 2023

(54) DOWNLINK RETRANSMISSION BY RELAY NODE

(71) Applicant: QUALCOMM Incorporated, San Diego, CA (US)

(72) Inventors: Navid Abedini, Basking Ridge, NJ (US); Muhammad Nazmul Islam, Littleton, MA (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/302,803

(22) Filed: May 12, 2021

(65) Prior Publication Data

US 2022/0368473 A1    Nov. 17, 2022

(51) Int. Cl.
*H04L 1/1867* (2023.01)
*H04W 8/24* (2009.01)
*H04W 24/08* (2009.01)

(52) U.S. Cl.
CPC ............ *H04L 1/1896* (2013.01); *H04L 1/189* (2013.01); *H04W 8/24* (2013.01); *H04W 24/08* (2013.01)

(58) Field of Classification Search
CPC ........ H04L 1/1896; H04L 1/189; H04W 8/24; H04W 24/08
USPC .......................................................... 370/329
See application file for complete search history.

(56) References Cited

U.S. PATENT DOCUMENTS

| 11,445,268 | B2* | 9/2022 | Hu ..................... H04W 40/125 |
| 2005/0232183 | A1 | 10/2005 | Sartori et al. |
| 2008/0108304 | A1* | 5/2008 | Suga ..................... H04W 16/26 455/7 |
| 2009/0175214 | A1 | 7/2009 | Sfar et al. |
| 2019/0159277 | A1* | 5/2019 | Zhu ......................... H04L 45/16 |
| 2020/0007223 | A1* | 1/2020 | Zhu .................... H04B 7/15542 |
| 2020/0100124 | A1* | 3/2020 | Hampel ................ H04W 24/04 |

(Continued)

FOREIGN PATENT DOCUMENTS

| EP | 1962451 A2 | 6/2008 |
| WO | WO-2022081845 A2 * | 4/2022 |
| WO | WO-2022086905 A1 * | 4/2022 |

OTHER PUBLICATIONS

International Search Report and Written Opinion—PCT/US2022/071752—ISA/EPO—Jul. 6, 2022.

*Primary Examiner* — Mong-Thuy T Tran
(74) *Attorney, Agent, or Firm* — Harrity & Harrity, LLP

(57) ABSTRACT

This disclosure provides systems, methods, and apparatuses for retransmission of a communication by a relay node based on a failure of a target node to receive the communication. In some aspects, the relay node may determine that the second wireless node has failed to receive the second communication, or an upstream wireless node (such as a distributed unit) may determine that the target node has failed to receive the communication. The relay node may retransmit the communication based on such a determination. In some aspects, the relay node may buffer the communication or information used to generate the communication, and may retransmit the buffered communication. In some aspects, a configuration for the retransmission may be modified based on a capability of the relay node or another concern.

26 Claims, 17 Drawing Sheets

(56) References Cited

U.S. PATENT DOCUMENTS

2020/0252847 A1* 8/2020 Park .................... H04W 36/08
2021/0037531 A1* 2/2021 Abedini ............. H04W 72/046

* cited by examiner

DOWNLINK RETRANSMISSION BY RELAY NODE

TECHNICAL FIELD

Aspects of the present disclosure relate generally to wireless communication and to techniques for downlink retransmission by a relay node.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station via the downlink (DL) and uplink (UL). "DL" (or "forward link") refers to the communication link from the base station to the UE, and "UL" (or "reverse link") refers to the communication link from the UE to the base station. As will be described in more detail herein, a base station may be referred to as a NodeB, an LTE evolved nodeB (eNB), a gNB, an access point (AP), a radio head, a transmit receive point (TRP), a New Radio (NR) base station, or a 5G NodeB.

These multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method performed by a communication device of a relay node. The method may include receiving, from a first wireless node and via a first wireless link, a first communication carrying a payload; generating a second communication associated with information of the first communication, where the second communication is different than the first communication, and where the second communication carries the payload; transmitting, to a second wireless node and via a second wireless link, the second communication; monitoring for an indication of whether the second wireless node has successfully received the second communication; and transmitting a retransmission of at least part of the second communication associated monitoring for the indication.

In some implementations, the method includes relaying, from the second wireless node, feedback indicating whether the second wireless node received the second communication, where the indication of whether the second wireless node has successfully received the second communication is based on the feedback.

In some implementations, the method includes transmitting capability information indicating that the relay node is capable of processing feedback indicating whether the second wireless node received the second communication, where receiving the indication further includes: receiving, from the second wireless node, the feedback indicating whether the second wireless node received the second communication.

In some implementations, the method includes transmitting a control channel carrying control information scheduling the retransmission.

In some implementations, the method includes generating the control channel for transmission.

Another innovative aspect of the subject matter described in this disclosure can be implemented in a method performed by a communication device of a first wireless node. The method may include transmitting, to a relay node, a first communication carrying a payload; receiving an indication of whether a second wireless node has successfully received the payload; and triggering a retransmission of at least part of a second communication carrying the payload after receiving the indication.

In some implementations, the indication includes feedback from the second wireless node regarding the second communication.

In some implementations, the method includes transmitting, prior to transmitting the first communication, control information relating to the first communication, where the control information relating to the first communication indicates a resource for the retransmission or a configuration for the retransmission.

In some implementations, the method includes transmitting, to the relay node, a control channel for the retransmission, where the control channel is for the relay node to schedule the retransmission at the second wireless node.

Another innovative aspect of the subject matter described in this disclosure can be implemented in a method performed by a communication device of a control node. The method may include transmitting, to a first wireless node, a first configuration relating to a first communication carrying a payload; and transmitting, to a relay node, a second configuration relating to: receiving the first communication, transmitting a second communication carrying the payload, and transmitting a retransmission of at least part of the second communication in association with monitoring for an indication of whether a second wireless node has successfully received the second communication.

In some implementations, the indication includes feedback from the second wireless node regarding the second communication.

In some implementations, the second configuration includes information indicating a resource for the retransmission or a configuration for the retransmission.

In some implementations, the first configuration includes control information indicating a resource for the retransmission or a configuration for the retransmission.

In some implementations, the method includes transmitting configuration information to the relay node, where the configuration information indicates a resource for the retransmission or a configuration for the retransmission.

In some implementations, a communication device of a relay node for wireless communication includes one or more interfaces configured to obtain, from a first wireless node and via a first wireless link, a first communication carrying a payload; a processing system configured to generate a second communication associated with information of the first communication, where the second communication is different than the first communication, and where the second communication carries the payload; the one or more interfaces configured to output, to a second wireless node and via a second wireless link, the second communication; the processing system further configured to monitor for an indication of whether the second wireless node has successfully received the second communication; and the one or more interfaces configured to output a retransmission of at least part of the second communication associated monitoring for the indication.

In some implementations, the processing system is further configured to: relay, from the second wireless node, feedback indicating whether the second wireless node received the second communication, where the indication of whether the second wireless node has successfully received the second communication is based on the feedback.

In some implementations, the one or more interfaces is configured to: output capability information indicating that the relay node is capable of processing feedback indicating whether the second wireless node received the second communication, where the one or more interfaces, when receiving the indication, is configured to: obtain, from the second wireless node, the feedback indicating whether the second wireless node received the second communication.

In some implementations, the one or more interfaces is further configured to: output a control channel carrying control information scheduling the retransmission.

In some implementations, the processing system is further configured to: generate the control channel for transmission.

Another innovative aspect of the subject matter described in this disclosure can be implemented in a communication device of a first wireless node for wireless communication. The communication device may include one or more interfaces configured to output, to a relay node, a first communication carrying a payload; the one or more interfaces configured to obtain an indication of whether a second wireless node has successfully received the payload; and a processing system configured to trigger a retransmission of at least part of a second communication carrying the payload after receiving the indication.

In some implementations, the indication includes feedback from the second wireless node regarding the second communication.

In some implementations, the feedback is relayed to the first wireless node by the relay node.

In some implementations, the one or more interfaces is further configured to output, prior to outputting the first communication, control information relating to the first communication, where the control information relating to the first communication relates to configuring the relay node to perform the second communication, and where triggering the retransmission further includes transmitting control information relating to the retransmission.

In some implementations, the one or more interfaces is further configured to: output, to the relay node, a control channel for the retransmission, where the control channel is for the relay node to schedule the retransmission at the second wireless node.

In some implementations, the one or more interfaces is further configured to: obtain capability information regarding the relay node, where at least one of the indication or triggering the retransmission is based on the capability information.

Another innovative aspect of the subject matter described in this disclosure can be implemented in a communication device of a control node for wireless communication. The communication device may include one or more interfaces configured to output, to a first wireless node, a first configuration relating to a first communication carrying a payload; and output, to a relay node, a second configuration relating to: obtaining the first communication, outputting a second communication carrying the payload, and outputting a retransmission of at least part of the second communication in association with monitoring for an indication of whether a second wireless node has successfully received the second communication.

In some implementations, the indication includes feedback from the second wireless node regarding the second communication.

In some implementations, the second configuration includes information indicating a resource for the retransmission or a configuration for the retransmission.

In some implementations, the first configuration includes control information indicating a resource for the retransmission or a configuration for the retransmission.

In some implementations, the one or more interfaces are further configured to: output configuration information to the relay node, where the configuration information indicates a resource for the retransmission or a configuration for the retransmission.

Another innovative aspect of the subject matter described in this disclosure can be implemented in a non-transitory computer-readable medium storing a set of instructions for wireless communication including one or more instructions. The one or more instructions, when executed by one or more processors of a relay node, may cause the relay node to receive, from a first wireless node and via a first wireless link, a first communication carrying a payload; generate a second communication associated with information of the first communication, where the second communication is different than the first communication, and where the second communication carries the payload; transmit, to a second wireless node and via a second wireless link, the second communication; monitor for an indication of whether the second wireless node has successfully received the second communication; and transmit a retransmission of at least part of the second communication associated monitoring for the indication.

In some implementations, the one or more instructions further cause the relay node to: relay, from the second wireless node, feedback indicating whether the second wireless node received the second communication, where the indication of whether the second wireless node has successfully received the second communication is based on the feedback.

In some implementations, the one or more instructions further cause the relay node to: transmit capability information indicating that the relay node is capable of processing feedback indicating whether the second wireless node received the second communication, where receiving the indication further includes: receive, from the second wireless node, the feedback indicating whether the second wireless node received the second communication.

In some implementations, the one or more instructions further cause the relay node to: transmit a control channel carrying control information scheduling the retransmission.

In some implementations, the one or more instructions further cause the relay node to: generate the control channel for transmission.

Another innovative aspect of the subject matter described in this disclosure can be implemented in a non-transitory computer-readable medium storing a set of instructions for wireless communication including one or more instructions. The one or more instructions, when executed by one or more processors of a first wireless node, may cause the first wireless node to transmit, to a relay node, a first communication carrying a payload; receive an indication of whether a second wireless node has successfully received the payload; and trigger a retransmission of at least part of a second communication carrying the payload after receiving the indication.

In some implementations, the indication includes feedback from the second wireless node regarding the second communication.

In some implementations, the one or more instructions further cause the first wireless node to: transmit, prior to transmitting the first communication, control information relating to the first communication, where the control information relating to the first communication relates to configuring the relay node to perform the second communication, and where triggering the retransmission further includes transmitting control information relating to the retransmission.

In some implementations, the one or more instructions further cause the first wireless node to: transmit, to the relay node, information indicating a resource for the retransmission or a configuration for the retransmission.

In some implementations, the one or more instructions further cause the first wireless node to: transmit, prior to transmitting the first communication, control information relating to the first communication, where the control information relating to the first communication indicates a resource for the retransmission or a configuration for the retransmission.

In some implementations, the one or more instructions further cause the first wireless node to: transmit, to the relay node, a control channel for the retransmission, where the control channel is for the relay node to schedule the retransmission at the second wireless node.

Another innovative aspect of the subject matter described in this disclosure can be implemented in a non-transitory computer-readable medium storing a set of instructions for wireless communication including one or more instructions. The one or more instructions, when executed by one or more processors of a control node, may cause the control node to transmit, to a first wireless node, a first configuration relating to a first communication carrying a payload; and transmit, to a relay node, a second configuration relating to: receiving the first communication, transmitting a second communication carrying the payload, and transmitting a retransmission of at least part of the second communication in association with monitoring for an indication of whether a second wireless node has successfully received the second communication.

In some implementations, the indication includes feedback from the second wireless node regarding the second communication.

In some implementations, the second configuration includes information indicating a resource for the retransmission or a configuration for the retransmission.

In some implementations, the first configuration includes control information indicating a resource for the retransmission or a configuration for the retransmission.

In some implementations, the one or more instructions further cause the control node to: transmit configuration information to the relay node, where the configuration information indicates a resource for the retransmission or a configuration for the retransmission.

Another innovative aspect of the subject matter described in this disclosure can be implemented in an apparatus for wireless communication. The apparatus may include means for receiving, from a first wireless node and via a first wireless link, a first communication carrying a payload; means for generating a second communication associated with information of the first communication, where the second communication is different than the first communication, and where the second communication carries the payload; means for transmitting, to a second wireless node and via a second wireless link, the second communication; means for monitoring for an indication of whether the second wireless node has successfully received the second communication; and means for transmitting a retransmission of at least part of the second communication associated monitoring for the indication.

In some implementations, the apparatus includes means for relaying, from the second wireless node, feedback indicating whether the second wireless node received the second communication, where the indication of whether the second wireless node has successfully received the second communication is based on the feedback.

In some implementations, the apparatus includes means for transmitting capability information indicating that the apparatus is capable of processing feedback indicating whether the second wireless node received the second communication, where the means for receiving the indication further includes: means for receiving, from the second wireless node, the feedback indicating whether the second wireless node received the second communication.

In some implementations, the apparatus includes means for transmitting a control channel carrying control information scheduling the retransmission.

In some implementations, the apparatus includes means for generating the control channel for transmission.

Another innovative aspect of the subject matter described in this disclosure can be implemented in an apparatus for wireless communication. The apparatus may include an apparatus for wireless communication includes means for transmitting, to a relay node, a first communication carrying a payload; means for receiving an indication of whether a second wireless node has successfully received the payload; and means for triggering a retransmission of at least part of a second communication carrying the payload after receiving the indication.

In some implementations, the indication includes feedback from the second wireless node regarding the second communication.

In some implementations, the apparatus includes means for transmitting, prior to transmitting the first communication, control information relating to the first communication, where the control information relating to the first communication relates to configuring the relay node to perform the second communication, and where the means for triggering the retransmission further includes means for transmitting control information relating to the retransmission.

In some implementations, the apparatus includes means for transmitting, to the relay node, a control channel for the retransmission, where the control channel is for the relay node to schedule the retransmission at the second wireless node.

Another innovative aspect of the subject matter described in this disclosure can be implemented in an apparatus for wireless communication. The apparatus may include means for transmitting, to a first wireless node, a first configuration relating to a first communication carrying a payload; and means for transmitting, to a relay node, a second configuration relating to: receiving the first communication, transmitting a second communication carrying the payload, and transmitting a retransmission of at least part of the second communication in association with monitoring for an indication of whether a second wireless node has successfully received the second communication.

In some implementations, the indication includes feedback from the second wireless node regarding the second communication.

In some implementations, the second configuration includes information indicating a resource for the retransmission or a configuration for the retransmission.

In some implementations, the first configuration includes control information indicating a resource for the retransmission or a configuration for the retransmission.

In some implementations, the apparatus includes means for transmitting configuration information to the relay node, where the configuration information indicates a resource for the retransmission or a configuration for the retransmission.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
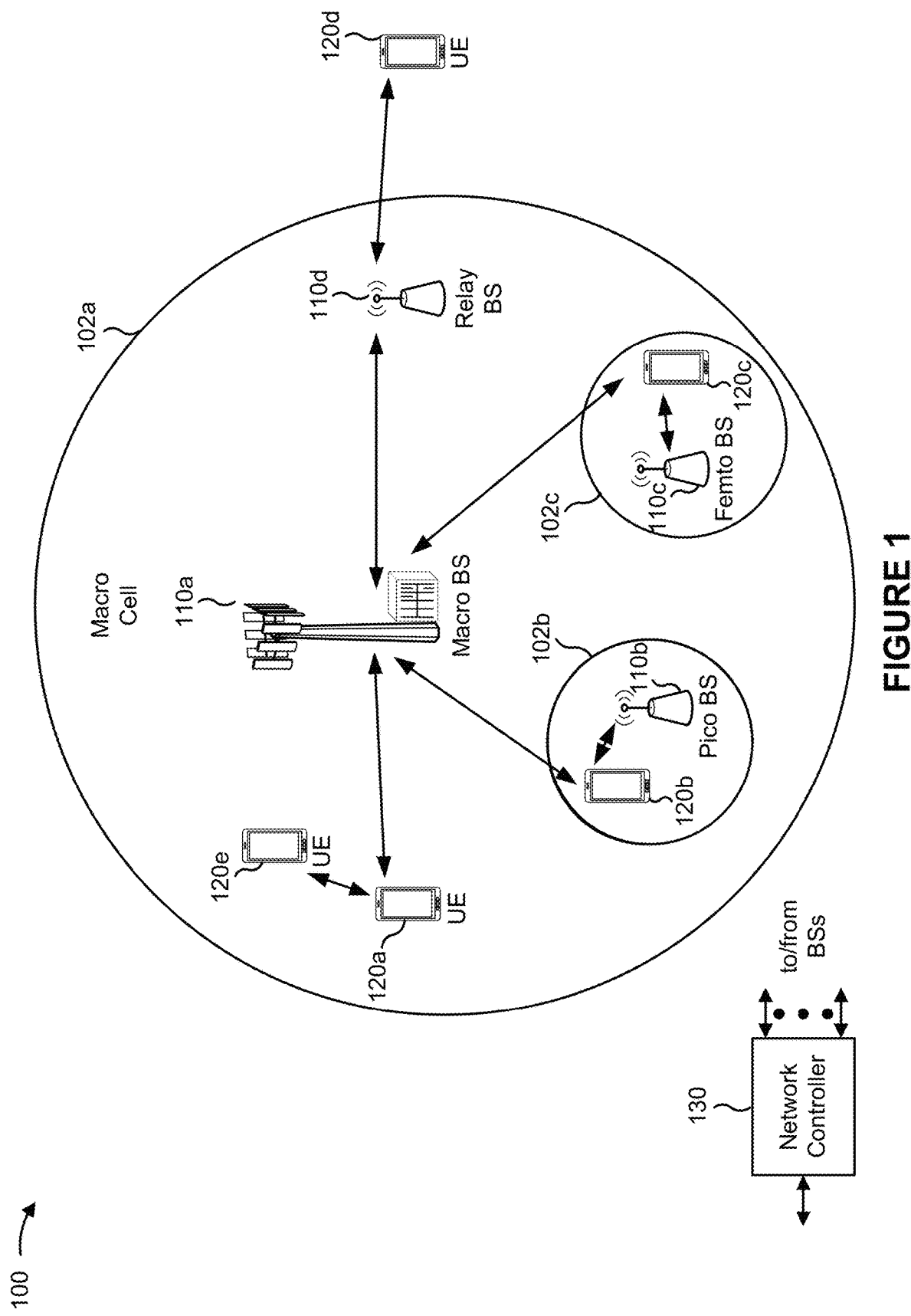
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A relay node is a device that receives a first communication and relays the first communication (such as in the form of a second communication). In some implementations, the relay node generates the second communication for the purpose of relaying a payload received in the first communication to a second wireless node (a target node of the payload). In some implementations, a relay node may generate the second communication based on information carried by the first communication. For example, the first communication may carry a set of in-phase/quadrature (I/Q) samples. The relay node may decode the first communication (which may include, for example, a physical downlink shared channel (PDSCH) or a physical uplink shared channel (PUSCH)), and may generate a second communication that carries the set of I/Q samples. Additionally, or alternatively, the first communication may carry information that identifies a destination of the payload, one or more parameters for relaying the payload, or similar information, which the relay node may use to generate and transmit the second communication. For example, the relay node may store or buffer the first communication or content of the first communication, and may use this stored or buffered information to generate and transmit the second communication. In some implementations, the relay node may first transmit (that is, output) control information that schedules a second communication, then may transmit the second communication via a shared channel on resources scheduled by the control information.

In some cases, a transmission of a second communication from a relay node to a target node (such as a second wireless node or another relay node) may fail, whether due to a failure of the target node to receive control information associated with the second communication or a failure of the target node to decode a shared channel of the second communication. However, it may be inefficient for a first wireless node (that is, the node that initiated transmission of the payload) to perform another end-to-end transmission of the payload for each failed transmission of a second communication. For example, such repeated transmissions may involve significant overhead and may introduce significant latency.

Some techniques described herein enable retransmission of a second communication by a relay node based on a failure of a second wireless node to receive the second communication. For example, the relay node may determine that the second wireless node has failed to receive the second communication. In some aspects, the relay node may perform this determination autonomously. In some aspects, the relay node may receive an indication that the second wireless node has failed to receive the second communication, such as from a distributed unit (DU) or another wireless node. The relay node may retransmit the second communication based on such a determination. For example, the relay node may buffer the second communication, and may retransmit the buffered second communication. In some aspects, a configuration for the retransmission may be modified based on a capability of the relay node or another concern.

Particular implementations of the subject matter described in this disclosure can be implemented to realize one or more of the following potential advantages. Overhead associated with retransmitting payloads for relaying operations may be reduced. Furthermore, by reducing overhead associated with acknowledgments in relay operations, the number of relay nodes that can be included in a relaying operation is increased. As such, and by employing the techniques disclosed herein, throughput may be increased. Still further, the processing and communication burden at the first wireless node (that is, the distributed unit) may be reduced. Even further, latency can be reduced by way of reducing overhead. Further, by reducing overhead and the number of transmitted communications, power usage can be reduced.

FIG. 1 is a diagram illustrating an example of a wireless network 100. The wireless network 100 may be or may include elements of a 5G New Radio (NR) network, an LTE network, or another type of network. The wireless network 100 may include one or more base stations 110 (shown as BS 110a, BS 110b, BS 110c, and BS 110d) and other network entities. A base station (BS) is an entity that communicates with user equipment (UEs) and also may be referred to as an NR base station, a Node B, a gNB, a 5G node B (NB), an access point, or a transmit receive point (TRP). Each base station may provide communication coverage for a particular geographic area. In 3GPP, the term "cell" can refer to a coverage area of a base station, a base station subsystem serving this coverage area, or a combination thereof, depending on the context in which the term is used.

A base station may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (for example, three) cells. The terms "eNB", "base station", "NR base station", "gNB", "TRP", "AP", "node B", "5G NB", and "cell" may be used interchangeably herein.

In some examples, a cell may not necessarily be stationary, and the geographic area of the cell may move according to the location of a mobile base station. In some examples, the base stations may be interconnected to one another as well as to one or more other base stations or network nodes (not shown) in the wireless network 100 through various types of backhaul interfaces, such as a direct physical connection, a virtual network, or a combination thereof, using any suitable transport network.

The wireless network 100 may include relay stations. A relay station is an entity that can receive a transmission of data from an upstream station (for example, a base station or a UE) and send a transmission of the data to a downstream station (for example, a UE or a base station). A relay station also may be a UE that can relay transmissions for other UEs. In the example shown in FIG. 1, a relay base station 110d may communicate with a macro base station 110a and a UE 120d in order to facilitate communication between the macro base station 110a and the UE 120d. A relay base station also may be referred to as a relay station, a relay base station, a relay, etc.

The wireless network 100 may be a heterogeneous network that includes base stations of different types, such as macro base stations, pico base stations, femto base stations, or relay base stations, among other examples. These different types of base stations may have different transmit power levels, different coverage areas, and different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

Multiple UEs 120 (for example, a UE 120a, a UE 120b, a UE 120c, etc.) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, or location tags, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, or other components. In some examples, the processor components and the memory components may be coupled together. For example, the processor components (for example, one or more processors) and the memory components (for example, a memory) may be operatively coupled, communicatively coupled, electronically coupled, or electrically coupled, among other examples.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some aspects, two or more UEs 120 (for example, shown as a UE 120a and a UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or a similar protocol), or a mesh network. In such examples, the UE 120 may perform scheduling operations, resource selection operations, as well as other operations described elsewhere herein as being performed by the base station 110.

Devices of the wireless network 100 may communicate using the electromagnetic spectrum, which may be subdivided based on frequency or wavelength into various classes, bands, or channels. For example, devices of the wireless network 100 may communicate using an operating band having a first frequency range (FR1), which may span from 410 MHz to 7.125 GHz. As another example, devices of the wireless network 100 may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. It is contemplated that the frequencies included in FR1 and FR2 may be modified, and techniques described herein are applicable to those modified frequency ranges.

Figure 2:
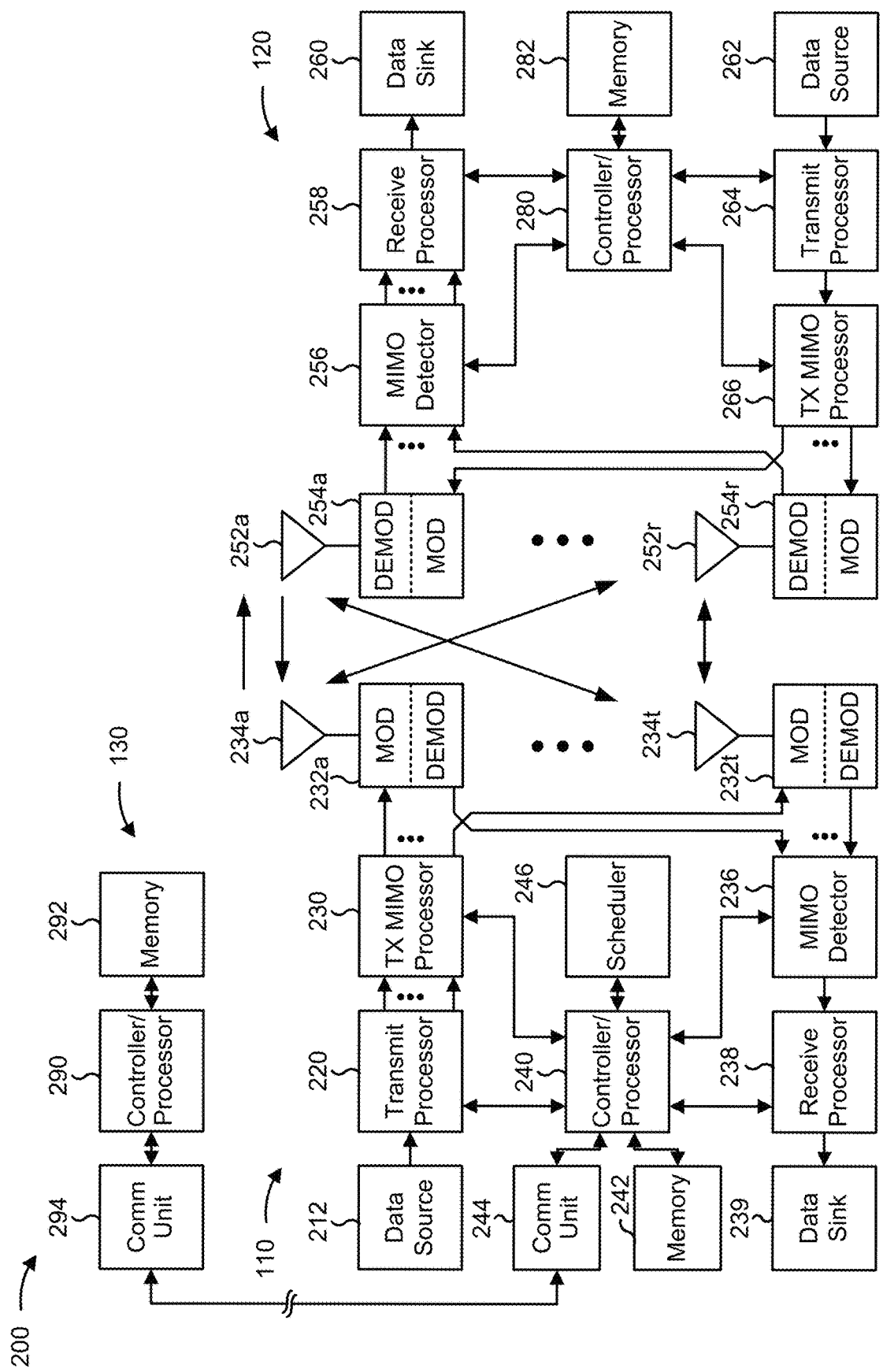
FIG. 2 is a diagram illustrating an example of a base station in communication with a user equipment (UE) in a wireless network.

FIG. 2 is a diagram illustrating an example 200 of a base station 110 in communication with a UE 120 in a wireless network 100. The base station 110 may be equipped with T antennas 234a through 234t, and the UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information) and control information (for example, CQI requests, grants, or upper layer signaling) and provide overhead symbols and control symbols. The transmit processor 220 also may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from the modulators 232a through 232t may be transmitted via T antennas 234a through 234t, respectively.

At the UE 120, the antennas 252a through 252r may receive the downlink signals from the base station 110 or other base stations and may provide received signals to the demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some aspects, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

Antennas (such as antennas 234a through 234t and/or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at the UE 120, a transmit processor 264 may receive and process data from a data source 262 and control information (for example, for reports including RSRP, RSSI, RSRQ, or CQI) from a controller/processor 280. The transmit processor 264 also may generate reference symbols for one or more reference signals. The symbols from the transmit processor 264 may be precoded by a TX MIMO processor 266 if applicable, further processed by the modulators 254a through 254r (for example, for DFT-s-OFDM or CP-OFDM) and transmitted to the base station 110. In some aspects, a modulator and a demodulator (for example, MOD/DEMOD 254) of the UE 120 may be included in a modem of the UE 120. In some aspects, the UE 120 includes a transceiver. The transceiver may include any combination of the antenna(s) 252, the modulators 254, the demodulators 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include a communication unit 244 and may communicate with the network controller 130 via the communication unit 244. The base station 110 may include a scheduler 246 to schedule one or more UEs 120 for downlink communications, uplink communications, or a combination thereof. In some aspects, a modulator and a demodulator (for example, MOD/DEMOD 232) of the base station 110 may be included in a modem of the base station 110. In some aspects, the base station 110 includes a transceiver. The transceiver may include any combination of the antenna(s) 234, the modulators 232, the demodulators 232, the MIMO detector 236, the receive processor 238, the transmit processor 220, or the TX MIMO processor 230. The transceiver may be used by a processor (for example, the controller/processor 240) and a memory 242 to perform aspects of any of the processes described herein.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, "processing system of the UE 120" may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system and one or more interfaces. In some aspects, the one or more interfaces may include a first interface to receive or obtain information and a second interface to output, transmit or provide information. In some cases, "first interface" may refer to an interface between the processing system of the chip or modem and a receiver, such that the UE 120 may receive information or signal inputs, and the information may be passed to the processing system. In some cases, "second interface" may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, "processing system of the base station 110" may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system and one or more interfaces. The one or more interfaces may include a first interface to receive or obtain information, and a second interface to output, transmit or provide information. In some cases, "first interface" may refer to an interface between the processing system of the chip or modem and a receiver, such that the base station 110 may receive information or signal inputs, and the information may be passed to the processing system. In some cases, "second interface" may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with efficient retransmission by a relay node, as described in more detail elsewhere herein. For example, the controller/processor 240 of the base station 110, the controller/processor 280 of the UE 120, or any other component(s) (or combinations of components) of FIG. 2 may perform or direct operations of, for example, process 1100 of FIG. 11, process 1200 of FIG. 12, process 1300 of FIG. 13, or other processes as described herein. The memory 242 and the memory 282 may store data and program codes for the base station 110 and the UE 120, respectively. In some aspects, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1100 of FIG. 11, process 1200 of FIG. 12, process 1300 of FIG. 13, or other processes as described herein.

In some aspects, a relay node (such as base station 110 or UE 120) includes means for receiving, from a first wireless node and via a first wireless link, a first communication carrying a payload; means for generating a second communication associated with information of the first communication, where the second communication is different than the first communication, and where the second communication carries the payload; means for transmitting, to a second wireless node and via a second wireless link, the second communication; means for monitoring for an indication of whether the second wireless node has successfully received the second communication; or means for transmitting a retransmission of at least part of the second communication associated monitoring for the indication. In some aspects, the means for the relay node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the relay node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a first wireless node (such as base station 110 or UE 120) includes means for transmitting, to a relay node, a first communication carrying a payload; means for receiving an indication of whether a second wireless node has successfully received the payload; or means for triggering a retransmission of at least part of a second communication carrying the payload after receiving the indication. In some aspects, the means for the first wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a control node (such as base station 110, a central unit, or the like) includes means for transmitting, to a first wireless node, a first configuration relating to a first communication carrying a payload; or means for transmitting, to a relay node, a second configuration relating to: means for receiving the first communication, means for transmitting a second communication carrying the payload, and means for transmitting a retransmission of at least part of the second communication in association with monitoring for an indication of whether a second wireless node has successfully received the second communication. In some aspects, the means for the control node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the control node to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
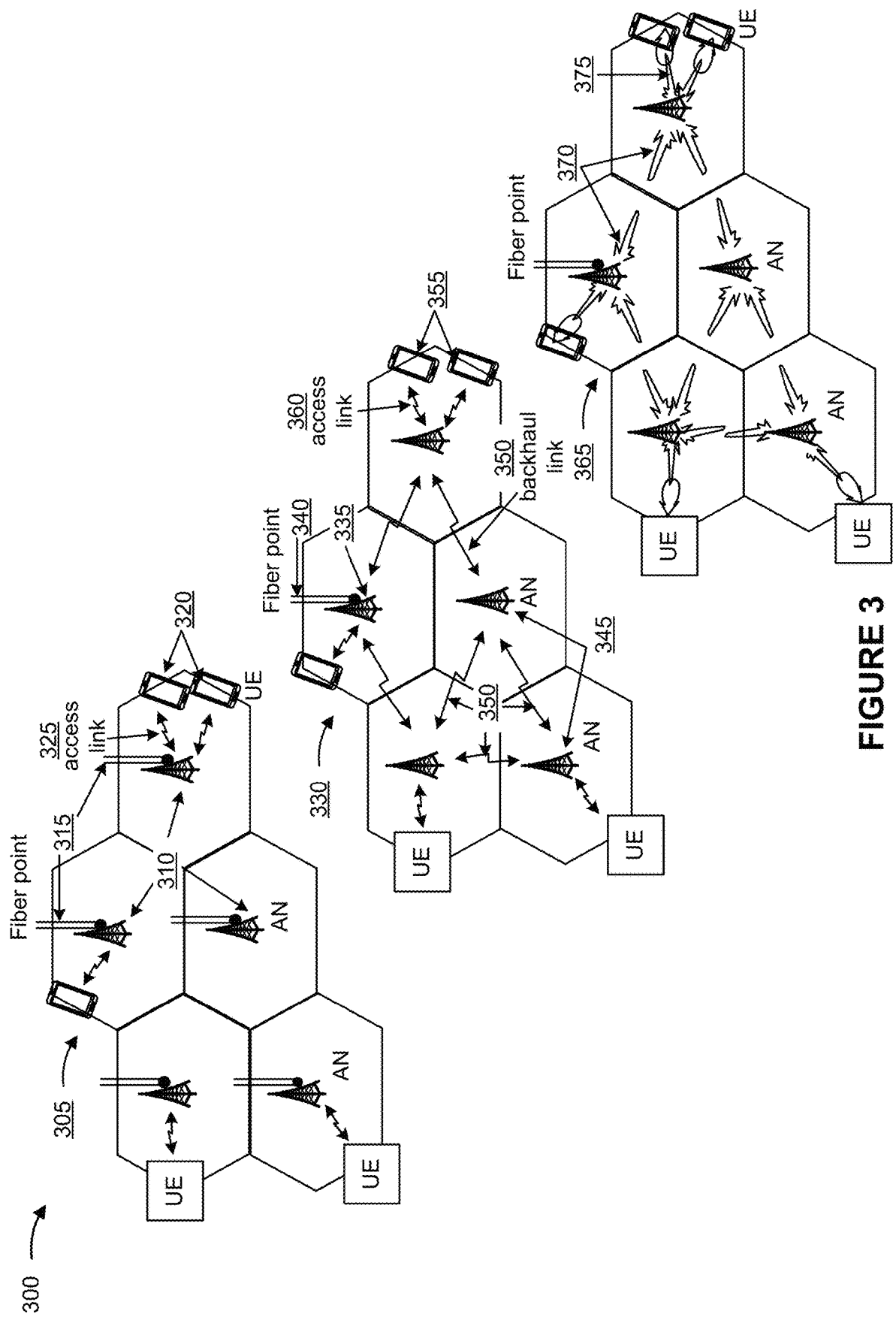
FIG. 3 is a diagram illustrating examples of radio access networks.

FIG. 3 is a diagram illustrating examples 300 of radio access networks.

As shown by reference number 305, a traditional radio access network, such as 3G, 4G, LTE, and so on, may include multiple base stations 310 (shown as access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network (RAN) may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (such as via one or more non-anchor base stations 345) to form a backhaul path to the core network for carrying backhaul traffic. Backhaul link 350 may be a wireless link. Anchor base station(s) 335 and non-anchor base station(s) 345 may communicate with one or more UEs 355 via access links 360, which may be wireless links for carrying access traffic. In some aspects, an anchor base station 335 or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology or directional communications (such as beamforming) for communications between base stations and UEs (that is, between two base stations, between two UEs, or between a base station and a UE). For example, wireless backhaul links 370 between base stations may use millimeter wave signals to carry information, and may be directed toward a target base station using beamforming. Similarly, the wireless access links 375 between a UE and a base station may use millimeter wave signals and may be directed toward a target wireless node (such as a UE or a base station). In this way, inter-link interference may be reduced.

Some techniques described herein enable retransmission of communications by a relay node based on a failure of a second wireless node to receive the communication. For example, the communication may originate from a base station (such as anchor base station 335 or non-anchor base station 345) and may be relayed to a destination by a relay node (such as non-anchor base station 345 or UE 355), where the destination may be a non-anchor base station 345 or a UE 355.

The configuration of base stations and UEs in FIG. 3 is shown as an example, and other examples are contemplated. For example, one or more base stations illustrated in FIG. 3 may be replaced by one or more UEs that communicate via a UE-to-UE access network (such as a peer-to-peer network or a device-to-device network). In this case, "anchor node" may refer to a UE that is directly in communication with a base station (such as an anchor base station or a non-anchor base station).

Figure 4:
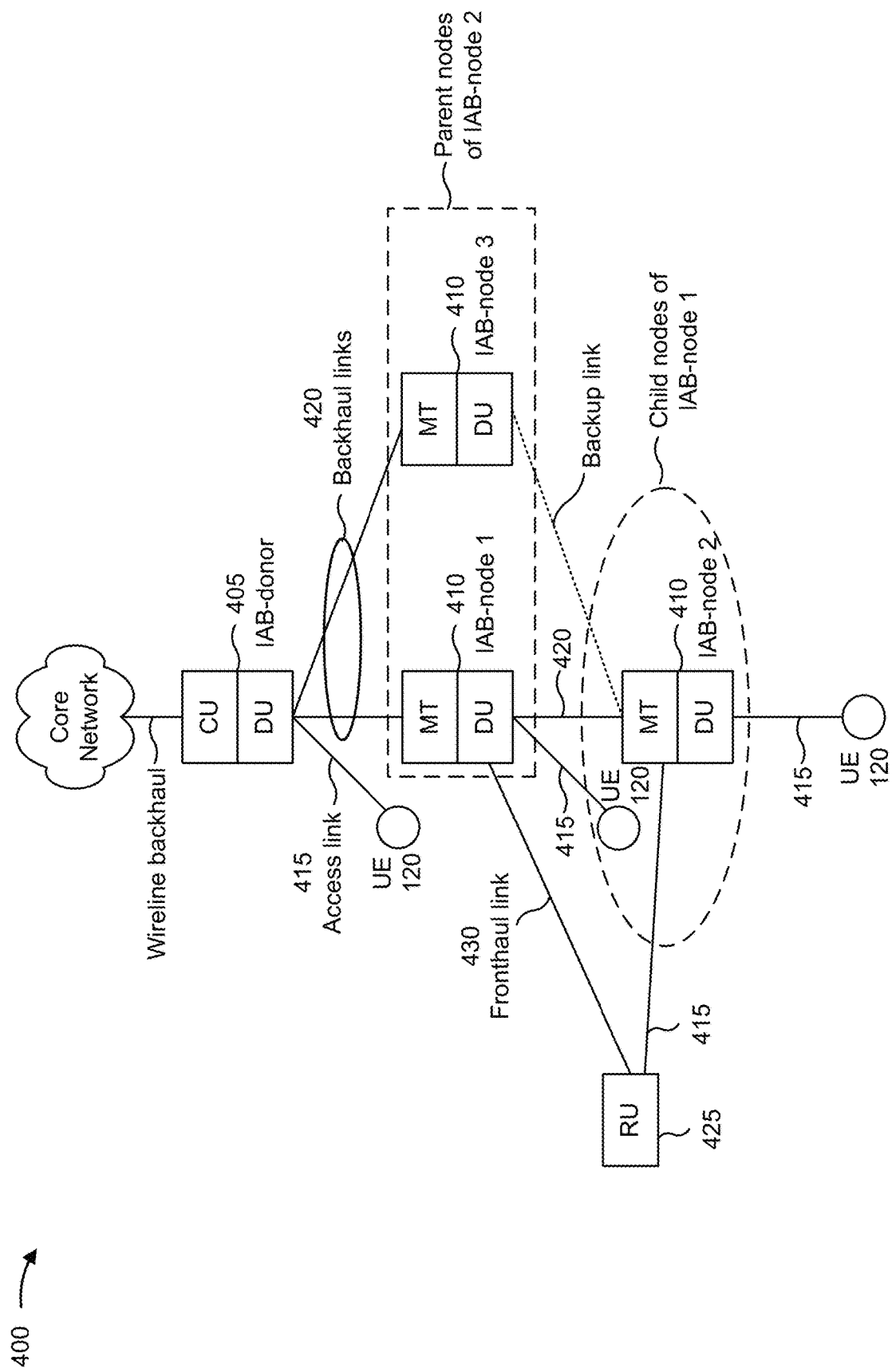
FIG. 4 is a diagram illustrating an example of an integrated access and backhaul (IAB) network architecture.

FIG. 4 is a diagram illustrating an example 400 of an IAB network architecture.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described in connection with 3. As shown, an IAB donor 405 may include a central unit (CU) (also referred to herein as a central node), which may perform access node controller (ANC) functions and AMF functions. The CU may configure one or more distributed units (DU)s of the IAB donor 405 and may configure one or more IAB nodes 410 (such as an mobile termination (MT) unit or a DU of an IAB node 410) that connect to the core network via the IAB donor 405. Thus, a CU of an IAB donor 405 may control and configure the entire IAB network that connects to the core network via the IAB donor 405, such as by using control messages and configuration messages (such as a radio resource control (RRC) configuration message or an F1 application protocol (FLAP) message). In some aspects, the one or more DUs may include an O-RAN DU and an O-RAN RU, as described herein.

In some aspects, the IAB network architecture may support open RAN (O-RAN) operability. O-RAN provides for disaggregation of hardware and software, as well as interfacing between hardware and software. In some aspects, O-RAN may use an architecture with a CU (such as a CU of IAB donor 405), one or more DUs (which may be termed an O-RAN DU or O-DU), and one or more radio units (RUs) (which may be termed an O-RAN RU or O-RU). The RU may perform digital front end functions, some physical layer functions, digital beamforming, and so on. The DU may handle radio link control (RLC), medium access control (MAC), and some physical (PHY) layer functions. The CU may handle certain gNB functions, such as transfer of user data, mobility control, radio access network (RAN) sharing, positioning, session management, and so on. The CU may control the operation of one or more DUs, and the one or more DUs may control the operation of one or more RUs.

In some aspects, the CU may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU. The CU may be configured to handle user plane functionality (i.e., Central Unit—User Plane (CU-UP)), control plane functionality (i.e., Central Unit—Control Plane (CU-CP)), or a combination thereof. In some implementations, the CU can be logically split into one or more CU-UP units and one or more CU-CP units. The CU can be implemented to communicate with the DU, as necessary, for network control and signaling.

The DU may correspond to a logical unit that includes one or more base station functions to control the operation of one or more radio units (RUs). In some aspects, the DU may host one or more of an RLC layer, a MAC layer, and one or more high PHY layers (such as modules for forward error correction (FEC) encoding and decoding, scrambling, modulation and demodulation, or the like) depending, at least in part, on a lower layer functional split. Each layer (or module) can be implemented with an interface configured to communicate signals with other layers (and modules) hosted by the DU, or with the control functions hosted by the CU.

Lower-level functionality can be implemented by one or more RUs. In some deployments, an RU, controlled by a DU, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the lower layer functional split. In such an architecture, the RU(s) can be implemented to handle over the air (OTA) communication with a UE 120. In some implementations, real-time and non-real-time aspects of control and user plane communication with the RU(s) can be controlled by the corresponding DU. In some scenarios, this configuration can enable the DU(s) and the CU to be implemented in a cloud-based RAN architecture, such as a virtual RAN (VRAN) architecture.

As further shown in FIG. 4, the IAB network may include IAB nodes 410 (shown as IAB-node 1, IAB-node 2, and IAB-node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (referred to as a child node) may be controlled and scheduled by another IAB node 410 (referred to as a parent node of the child node) or by an IAB donor 405. The DU functions of an IAB node 410 (a parent node) may control and schedule other IAB nodes 410 (child nodes of the parent node) and UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and schedule communications of IAB nodes 410 and UEs 120. A UE 120 may include only MT functions, and not DU functions. That is, communications of a UE 120 may be controlled and scheduled by an IAB donor 405 or an IAB node 410 (such as a parent node of the UE 120).

When a first node controls and schedules communications for a second node (such as when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and schedule communications for child nodes of the parent node. A parent node may be an IAB donor 405 or an IAB node 410, and a child node may be an IAB node 410 or a UE 120. Communications of an MT function of a child node may be controlled and scheduled by a parent node of the child node.

As further shown in FIG. 4, a link between a UE 120 (which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (such as time resources, frequency resources, and spatial resources) may be shared between access links 415 and backhaul links 420. In some aspects, a backhaul link 420 may be a primary backhaul link or a secondary backhaul link (also referred to as a backup backhaul link). In some aspects, a secondary backhaul link may be used if a primary backhaul link fails, becomes congested, or becomes overloaded. For example, a backup link between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410, among other examples described elsewhere herein.

In some aspects, an IAB node 410 (a parent node) may be unable to communicate with another IAB node 410 (a child node) using a direct access link. For example, IAB-node 2 may be outside of a communication range of IAB-node 1 or the direct access link between IAB-node 1 and IAB-node 2 may be blocked. IAB-node 1 may utilize a remote unit (RU) node 425 (such as a relay node or a repeater node) to communicate with IAB-node 2. The IAB-node 1 (that is, the DU of IAB-node 1) may communicate with the RU node 425 using a fronthaul link 430. For example, the IAB-node 1 may transmit a communication to the RU node 425 using the fronthaul link 430. The RU node 425 may forward the communication to the IAB-node 2 using an access link 415 between the IAB-node 2 and the RU node 425. In this way, the IAB-node 1 may extend coverage of the IAB-node 1 and communicate with the IAB-node 2 when the IAB-node 1 is unable to use a direct access link between IAB-node 1 and IAB-node 2 for direct communications. Some techniques described herein enable retransmission of a communication by a relay node based on a failure of a downstream wireless node (such as a child node) to receive the communication, which eliminates a need for an upstream node (such as a parent node) to perform an end-to-end retransmission.

Figure 5:
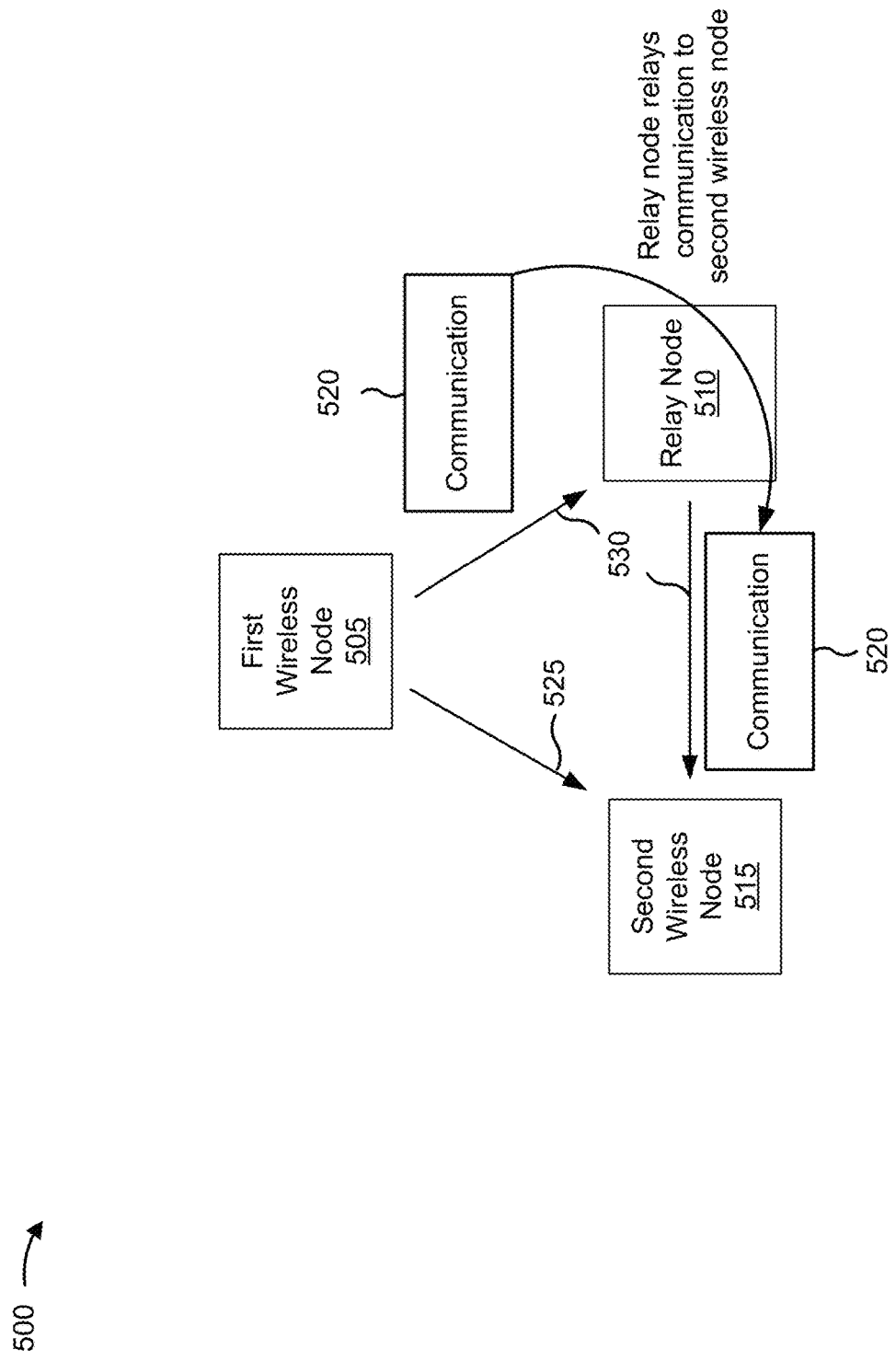
FIG. 5 is a diagram illustrating an example of a relay node that relays communications between a first wireless node and a second wireless node.

FIG. 5 is a diagram illustrating an example 500 of a relay node that relays communications between a first wireless node and a second wireless node. As shown, example 500 includes a first wireless node 505 (such as an IAB node, an IAB donor, a base station 110, or a UE 120), a relay node 510 (such as a relay device, a relay base station 110, an RU node 425, or a relay UE 120), and a second wireless node 515 (such as an IAB node, an IAB donor, a base station 110, an RU node 425, or a UE 120). In example 500, one or more of the first wireless node 505 and the second wireless node 515 may be aware of the relay node 510. In some aspects, the first wireless node 505 and the second wireless node 515 may be unaware of the relay node 510.

As shown in FIG. 5, the first wireless node 505 may determine to transmit a communication 520 (which may be a data communication, a control communication, or another form of communication) to the second wireless node 515 using a direct link 525 (an access link) between the first wireless node 505 and the second wireless node 515. However, the first wireless node 505 may be unable to transmit the communication 520 to the second wireless node 515 using the direct link 525. For example, the second wireless node 515 may be outside of a transmit range of the first wireless node 505 or the direct link 525 may be blocked.

Therefore, the first wireless node 505 may communicate with the second wireless node 515 using an indirect link 530. For example, the first wireless node 505 may transmit the communication 520 to the relay node 510. In some aspects, the first wireless node 505 may transmit the communication 520 directly to the relay node 510 (when the first wireless node 505 is aware of the relay node 510). In some aspects, the relay node 510 may be configured (by a control node not shown in FIG. 5 or by the second wireless node 515) to receive the communication 520 from the first wireless node 505 (such as if the first wireless node 505 is unaware of the relay node 510).

As shown in FIG. 5, the communication 520 may pass through the relay node 510 and be relayed by the relay node 510. For example, the relay node 510 may receive the communication 520 (as a first communication) and may generate another communication (referred to herein as a second communication) based on the communication 520. In some cases, an indirect link 530 may be an access link, a sidelink, or a fronthaul link. For example, if the first wireless node 505 is a base station 110 and the second wireless node 515 is a UE 120, the indirect link 530 between the first wireless node 505 and the relay node 510 may be a fronthaul link. The indirect link 530 between the relay node 510 and the second wireless node 515 may be an access link. Using the communication scheme shown in FIG. 5 may improve network performance and increase reliability by providing the first wireless node 505 and the second wireless node 515 with link diversity for communications and by extending a communication coverage area of the first wireless node 505 and the second wireless node 515. Techniques described herein enable the relay node 510 to perform retransmission of a communication 520 which the second wireless node 515 failed to receive, which eliminates a need for the first wireless node 505 to perform an end-to-end retransmission of the communication 520 (that is, starting at the first wireless node 505, through the relay node 510, to the second wireless node 515).

Figure 6:
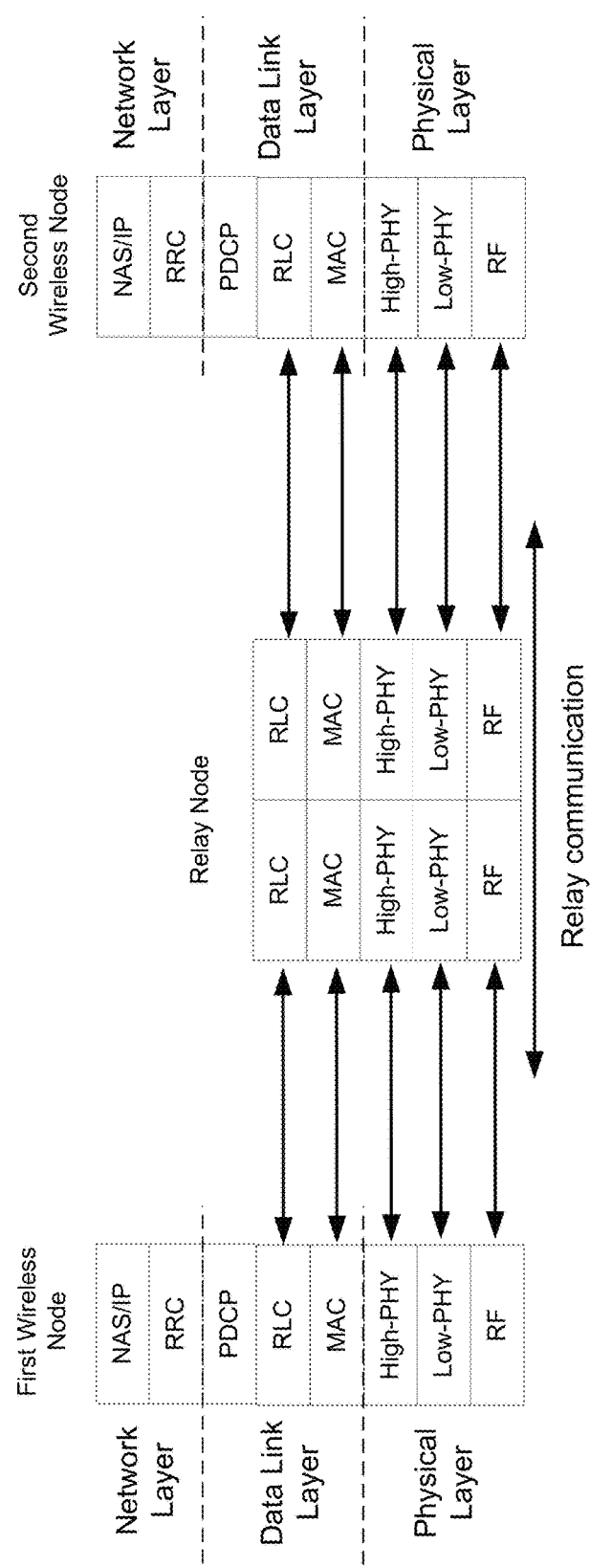
FIG. 6 is a diagram illustrating an example of a protocol stack for relaying communications between a first wireless node and second wireless node.

FIG. 6 is a diagram illustrating an example 600 of a protocol stack for relaying communications between a first wireless node and second wireless node.

As shown in FIG. 6, an NR protocol stack implemented on a first wireless node and on a second wireless node includes a network layer (sometimes referred to as Layer 3), a data link layer (sometimes referred to as Layer 2) and a physical layer (sometimes referred to as Layer 1). The network layer may include a non-access stratum (NAS) layer, an internet protocol (IP) layer, and a radio resource control (RRC) layer. The data link layer may include a packet data convergence protocol (PDCP) layer, a radio link control (RLC) layer, and a medium access control (MAC) layer. The physical layer may include a high-physical (PHY) layer, a low-PHY layer, and a radio frequency (RF) layer. In some aspects, the PDCP layer on a wireless node may include an adaptation sub-layer (such as a service data adaptation protocol (SDAP) sub-layer).

In some aspects, such as in an IAB network, one or more of the NAS layer, the IP layer, the RRC layer, and the PDCP layer may be included in a CU of an IAB donor. The remaining layers (that is, the RLC layer, the MAC layer, the high-PHY layer, the low-PHY layer, and the RF layer) may be included in a DU of an IAB donor or of an IAB node.

When communicating directly with the second wireless node, the first wireless node may communicate at an RLC layer, a MAC layer, a high-PHY layer, a low-PHY layer, or an RF layer. As shown in FIG. 6, the layers in the first wireless node may communicate with corresponding layers in the second wireless node. However, in a relay scenario, the first wireless node may communicate via a link (such as an access link or a fronthaul link) with a relay node. For example, to enable Layer 2 relaying (that is, data link layer relaying) between the first wireless node and the second wireless node, the relay node may include an RLC layer, a MAC layer, a high-PHY layer, a low-PHY layer, and an RF layer to communicate with a corresponding RLC layer, MAC layer, high-PHY layer, low-PHY layer, and RF layer of the first wireless node and second wireless node. Based on passing information between these layers, the relay node enables Layer 2 relaying between the first wireless node and the second wireless node. A relay node that performs Layer 2 relaying as described herein may be referred to as a Layer 2 relay node.

In some aspects, the relay node may utilize Layer 1 relaying (sometimes referred to as physical layer relaying). For example, the relay node may not include an RLC layer or a MAC layer. As the relay node may not include an RLC or MAC layer, the relay node may be configured and scheduled by a control node (such as a CU, an IAB donor, and IAB node, a base station 110, the first wireless node, or the second wireless node). The relay node may communicate with the first wireless node and the second wireless node at the physical layer only (rather than the data link layer and the physical layer). Based on passing information between these layers, the relay node enables Layer 1 relaying between the first wireless node and the second wireless node. A relay node that performs Layer 1 relaying as described herein may be referred to as a Layer 1 relay node.

Figure 7A:
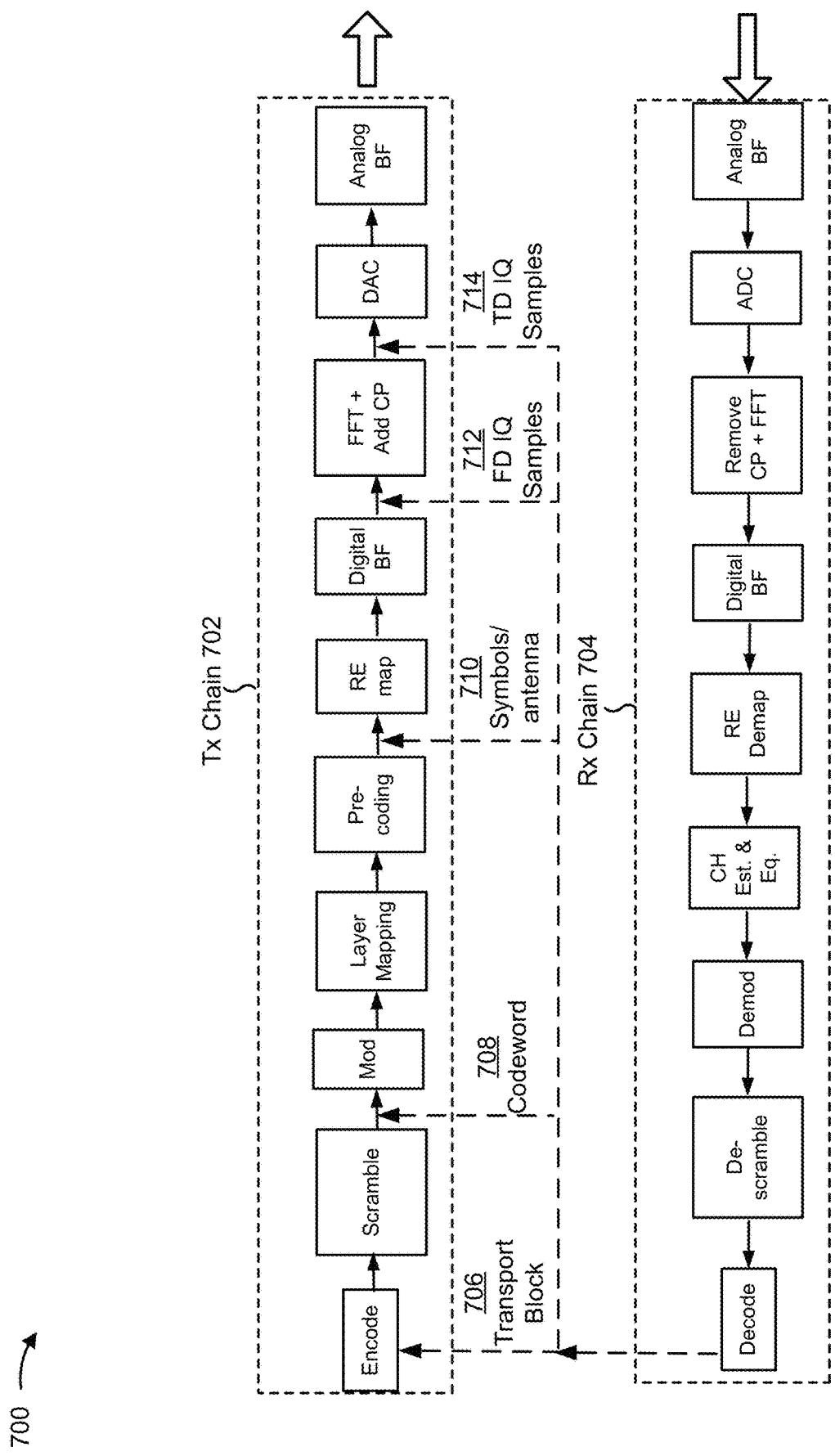
FIGS. 7A and 7B are diagrams illustrating examples of transmit (Tx) and receive (Rx) chains of a Layer 1 relay node.
Figure 7B:
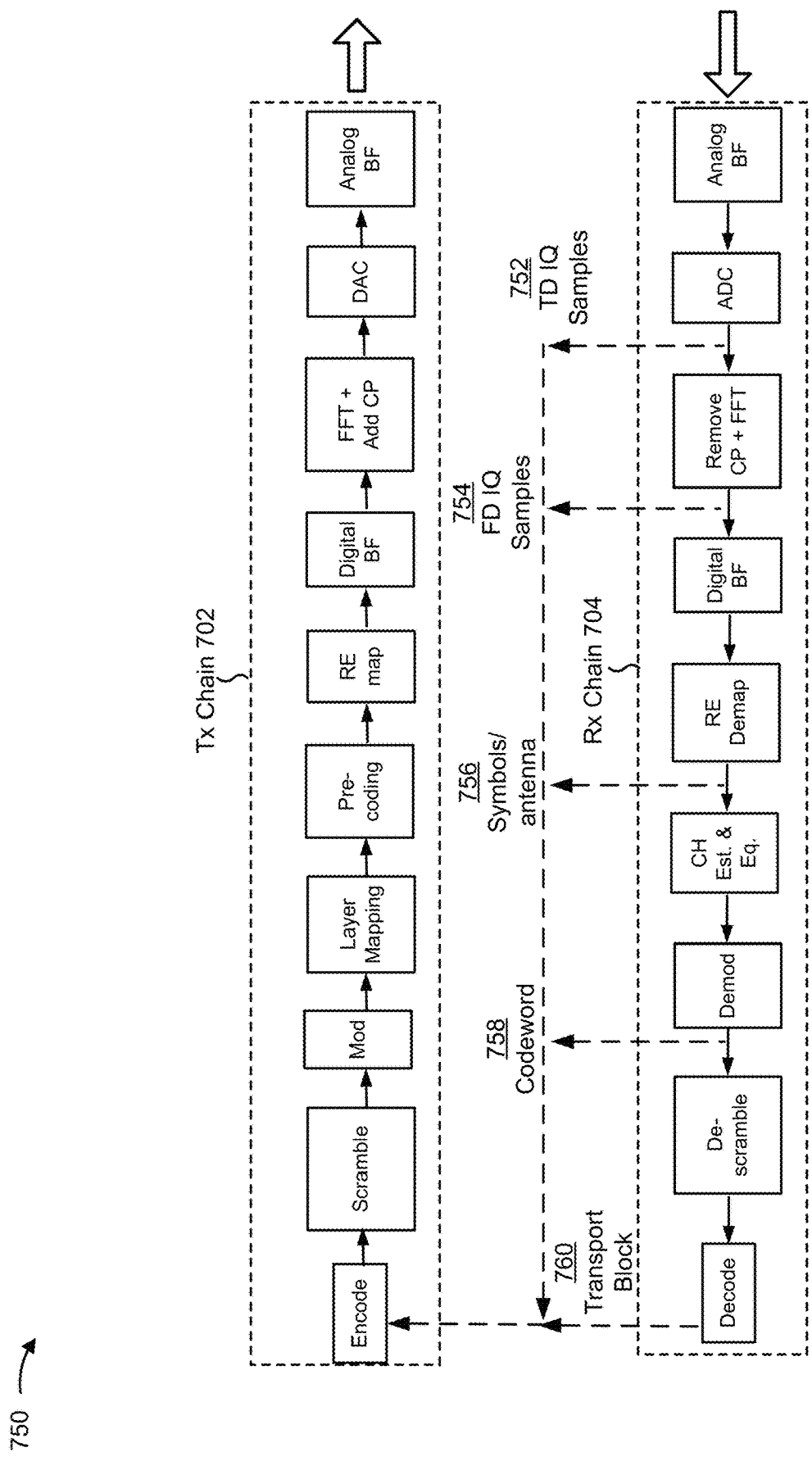

FIGS. 7A and 7B are diagrams illustrating examples 700 and 750 of transmit (Tx) and receive (Rx) chains of a Layer 1 relay node.

In some aspects, one or more components of Tx chain 702 may be implemented in transmit processor 264, TX MIMO processor 266, MOD/DEMOD 254, controller/processor 280, or another component described in connection with FIG. 2. In some aspects, Tx chain 702 may be implemented in a relay node (such as RU node 425, relay node 510, or relay node 815 described with reference to FIGS. 4, 5 and 8, respectively) for transmitting an outgoing signal (such as uplink data, downlink data, an uplink reference signal, a downlink reference signal, uplink control information, or downlink control information) associated with a relaying operation performed by the relay node.

In some aspects, one or more components of Rx chain 704 may be implemented in receive processor 258, MIMO detector 256, MOD/DEMOD 254, or controller/processor 280, as described in connection with FIG. 2. In some aspects, Rx chain 704 may be implemented in a relay node for receiving an incoming signal (such as downlink data, uplink data, a downlink reference signal, an uplink reference signal, downlink control information, or uplink control information) associated with a relaying operation performed by the relay node.

As shown in FIG. 7A and example 700, the relay node may receive the incoming signal over a fronthaul link. For example, the incoming signal may be downlink information received from a DU of an IAB node, a base station 110, or a similar device. As shown in FIG. 7A, the incoming signal may be processed by the Rx chain 704. For example, the relay node may fully decode the incoming signal to determine information (such as a payload) carried by the incoming signal. The relay node may perform analog beamforming on the incoming signal. The relay node may convert the incoming signal from the analog domain to the digital domain using an analog-to-digital converter (ADC). The relay node may remove a cyclic prefix (CP) and perform a Fast Fourier Transform (FFT) associated with the incoming signal. The relay node may perform a digital beamforming process on the incoming signal (such as based on a digital Tx beamforming configuration). The relay node may perform an RE de-mapping procedure based on an RE mapping configuration received by the relay node to identify REs of the signal and occupied tones. The relay node may perform channel estimation and channel equalization on the incoming signal to identify and remove noise associated with the incoming signal. The relay node may perform a demodulation procedure on the incoming signal. The relay node may de-scramble the incoming signal, such as using scrambling IDs associated with the incoming signal. The relay node may decode the incoming signal, such as based on an MCS associated with the incoming signal.

After decoding the incoming signal, the relay node may identify information carried by the incoming signal. For example, a payload of the incoming signal may include time domain IQ samples, frequency domain IQ samples, symbols per antenna (IQ symbols of occupied tones), a codeword, a transport block, or similar examples. The relay node may generate an outgoing signal using the Tx chain 702. An amount or level of processing performed by the relay node associated with the Tx chain 702 may be based on the information carried by the incoming signal, a configuration received by the relay node (such as from a control node), or other factors.

As shown by reference number 706, if the incoming signal is carrying a transport block, the relay node may generate the outgoing signal by fully encoding the transport block to form the outgoing signal (such as by encoding the transport block according to a Tx MCS, scrambling the encoded transport block, modulating the scrambled transport block, performing layer mapping, pre-coding, performing digital Rx beamforming, applying one or more of an FFT or a CP, converting the signal from the digital domain to the analog domain with a digital-to-analog converter (DAC), performing analog beamforming, and transmitting the outgoing signal).

As shown by reference number 708, if the incoming signal is carrying a codeword, the relay node may not perform encoding or scrambling to generate the outgoing signal. That is, the relay node may modulate the codeword, perform layer mapping, perform pre-coding, perform digital Rx beamforming, apply one or more of an FFT or a CP, convert the signal from the digital domain to the analog domain with a DAC, perform analog beamforming, and transmit the outgoing signal.

As shown by reference number 710, if the incoming signal is carrying an indication of symbols per antenna (such as IQ symbols of occupied tones), the relay node may not perform encoding, scrambling, modulating, layer mapping, or pre-coding. That is, the relay node may perform digital Rx beamforming to the IQ symbols of occupied tones, apply one or more of an FFT or a CP, convert the signal from the digital domain to the analog domain with a DAC, perform analog beamforming, and transmit the outgoing signal.

As shown by reference number 712, if the incoming signal is carrying frequency domain IQ samples, the relay node may not perform encoding, scrambling, modulating, layer mapping, pre-coding, or digital beamforming. That is, the relay node may apply one or more of an FFT or a CP to the frequency domain IQ samples, convert the signal from the digital domain to the analog domain with a DAC, perform analog beamforming, and transmit the outgoing signal.

As shown by reference number 714, if the incoming signal is carrying time domain IQ samples, the relay node may not perform encoding, scrambling, modulating, layer mapping, pre-coding, digital beamforming, FFT application, or CP addition. That is, the relay node may convert the time domain IQ samples from the digital domain to the analog domain with a DAC, perform analog beamforming, and transmit the outgoing signal.

As a result, the level of digital processing used to generate the outgoing signal may vary based on information carried by the incoming signal. The relay node may process the incoming signal to identify information included in a payload of the incoming signal. The relay node may generate an outgoing signal based on the information carried by the incoming signal.

As shown in FIG. 7B and example 750, the relay node may receive an incoming signal over an access link. For example, the incoming signal may be uplink information received from a device such as an MT unit of an IAB node or a UE 120. In some aspects, the device transmitting the incoming signal may be unaware of the relay node. In some other aspects, the device transmitting the incoming signal may be aware of the relay node.

A relay node may a level of digital processing to determine information associated with the incoming signal. The level of digital processing may be based on a configuration received by the relay node (such as from a control node). For example, as shown by reference number 752, the relay node may process the incoming signal to determine time domain IQ samples associated with the incoming signal. The relay node may generate the outgoing signal by processing the time domain IQ samples and including them in a payload of the outgoing signal, such as by fully encoding a transport block indicating the time domain IQ samples. The outgoing signal may be transmitted using a fronthaul link to another wireless node.

As shown by reference number 754, the relay node may process the incoming signal to determine frequency domain IQ samples associated with the incoming signal. The relay node may generate the outgoing signal by processing the frequency domain IQ samples and including them in a payload of the outgoing signal, such as by fully encoding a transport block indicating the frequency domain IQ samples. The outgoing signal may be transmitted using a fronthaul link to another wireless node.

As shown by reference number 756, the relay node may process the incoming signal to determine symbols per antennas (such as IQ symbols of occupied tones) associated with the incoming signal. The relay node may generate the outgoing signal by processing the symbols per antenna and including them in a payload of the outgoing signal, such as by fully encoding a transport block indicating the symbols per antenna. The outgoing signal may be transmitted using a fronthaul link to another wireless node.

As shown by reference number 758, the relay node may process the incoming signal to determine a received codeword (that is, log likelihood ratio (LLR) values associated with the incoming signal) associated with the incoming signal. The relay node may generate the outgoing signal by processing the received codeword and including it in a payload of the outgoing signal, such as by fully encoding a transport block indicating the received codeword. The outgoing signal may be transmitted using a fronthaul link to another wireless node.

As shown by reference number 760, the relay node may process the incoming signal to determine a transport block associated with the incoming signal. For example, the relay node may fully decode the incoming signal. The relay node may generate the outgoing signal by processing the transport block and including the transport block in a payload of the outgoing signal, such as by fully encoding a transport block. The outgoing signal may be transmitted using a fronthaul link to another wireless node.

The level of processing performed on the incoming signal may be configured by a control node or another wireless node. The outgoing signal may include information about the incoming signal based on the level of processing performed by the relay node.

Figure 8:
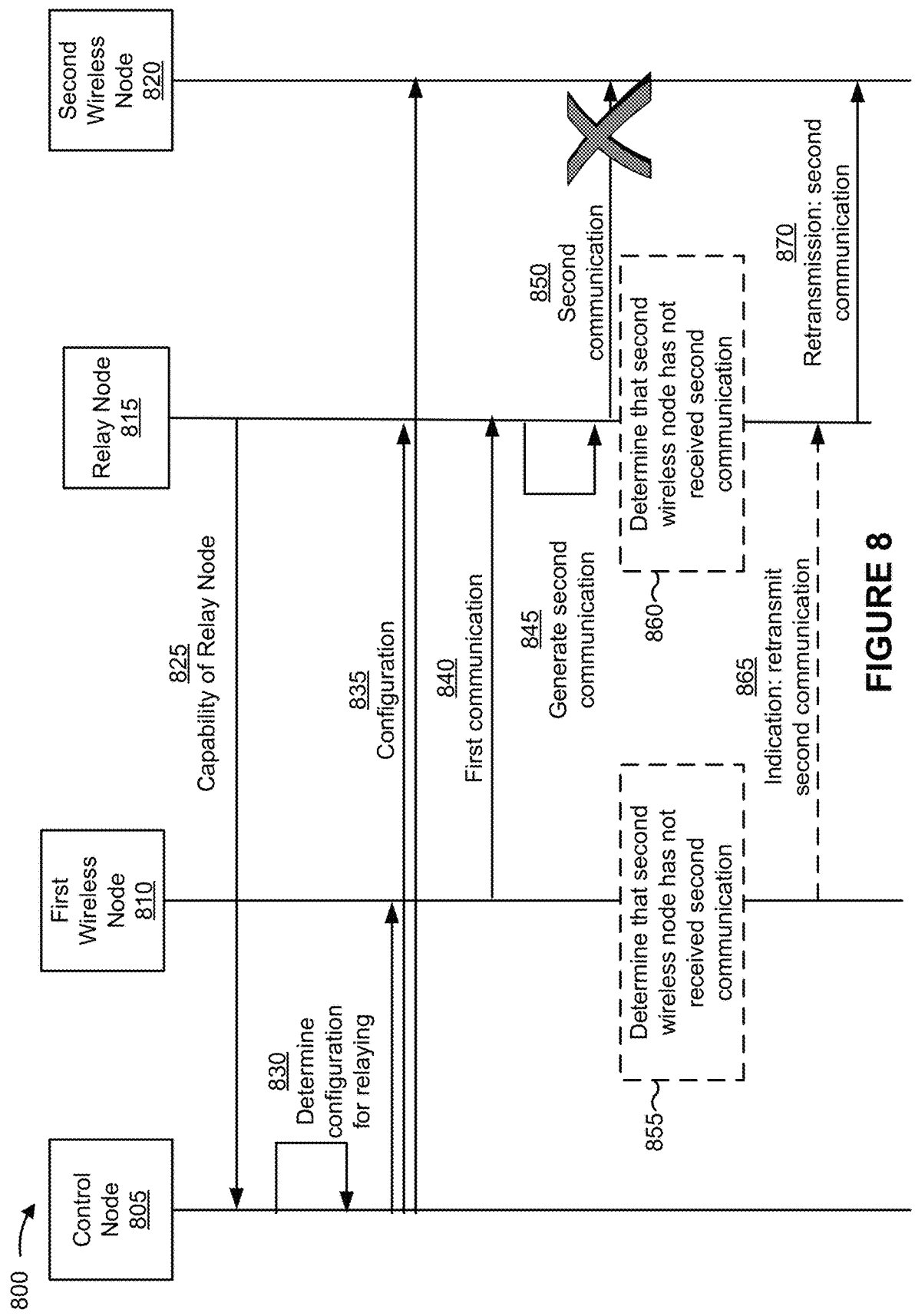
FIG. 8 is a diagram illustrating an example of signaling associated with retransmission by a relay node for a relaying operation.

FIG. 8 is a diagram illustrating an example 800 of signaling associated with retransmission by a relay node for a relaying operation. As shown, example 800 includes a control node 805, a first wireless node 810, a relay node 815, and a second wireless node 820. In some aspects, the control node 805 may be a base station 110, a CU of an IAB donor such as IAB-donor 405, a DU of an IAB node such as IAB node 410, or an IAB node such as IAB node 410. In some aspects, the first wireless node 810 may be a base station 110, a UE 120, an IAB donor such as IAB donor 405, an IAB node such as IAB node 410, or another relay node 815. In some aspects, the relay node 815 may be a relay device, a remote unit of an IAB node, a relay station, a Layer 1 relay device, a millimeter wave relay device, a base station 110, a UE 120, an RU node 425, a relay node 510, or an IAB node such as IAB node 410. In some aspects, the second wireless node 820 may be a base station 110, a UE 120, an IAB donor such as IAB-donor 405, an RU node 425, a relay node 510, an IAB node such as IAB node 410, or another relay node 815. In some aspects, the second wireless node 820 may be a device for which a relayed communication is destined. In some other aspects, the second wireless node 820 may be a next relay node, after the relay node 815, in a path of the relayed communication. Operations described as performed by the control node 805 may be performed by a communication device of the control node 805. Operations described as performed by the first wireless node 810 may be performed by a communication device of the first wireless node 810. Operations described as performed by the relay node 815 may be performed by a communication device of the relay node 815. Operations described as performed by the second wireless node 820 may be performed by a communication device of the second wireless node 820.

As shown by reference number 825, the relay node 815 may transmit, to the control node 805, capability information indicating a capability of the relay node 815. In some aspects, the information indicating the capability may indicate whether the relay node 815 can process an acknowledgment (ACK) or negative ACK (NACK) (ACK/NACK) from a second wireless node 820. If the relay node 815 can process the ACK/NACK from the second wireless node 820, then the relay node 815 can determine whether retransmission of a second communication is needed, as described in connection with reference number 860. In some aspects, the control node 805 may receive information indicating capabilities of the first wireless node 810 or the second wireless node 820.

In some aspects, the capability may indicate one or more relaying operations supported by the relay node 815 (such as a duplexing capability of the relay node 815 or a buffer capability of the relay node 815), one or more digital processing operations supported by the relay node 815 (as described in more detail with respect to FIGS. 7A and 7B), beamforming codebook information associated with a beamforming codebook stored by the relay node 815 (such as indicating one or more transmit beams, one or more receive beams, spatial quasi co-location information associated with the beams, a number of antenna arrays of the relay node 815, a number of antenna panels of the relay node 815, an indication of which beams are associated with which antenna arrays or antenna panels, and so on), a beamforming configuration capability of the relay node 815 (such as indicating if beamforming parameters, such as a phase setting or an amplitude setting of the relay node 815 can be dynamically configured by the control node 805), a transmit power configuration of the relay node 815 (such as indicating a power headroom of the relay node 815, a maximum transmit power supported by the relay node 815, a maximum gain level supported by the relay node 815, a current gain setting of the relay node 815, a current transmit power setting of the relay node 815, and so on), a buffer status of the relay node 815 (such as indicating an available memory of the buffer of the relay node 815, a maximum buffer size, a buffer overflow indication, and so on), a conversion configuration associated with converting between analog signals and digital signals (such as an analog-to-digital conversion setting or a digital-to-analog conversion setting), an in-phase/quadrature (IQ) sample compression capability of the relay node 815, or similar examples.

As shown by reference number 830, the control node 805 may determine a configuration for relaying associated with the first wireless node 810, the relay node 815, and the second wireless node 820. For example, in some aspects, the control node 805 may control operations of one or more of the first wireless node 810, the relay node 815, or the second wireless node 820 for a relaying operation. In some other aspects, the control node 805 may configure one or more of the first wireless node 810, the relay node 815, or the second wireless node 820 to perform the relaying operation.

In some aspects, the configuration may indicate a resource for a retransmission by the relay node 815. For example, the configuration may indicate a semi-static configuration of the resource for the retransmission. In some other aspects, a resource for a retransmission may be indicated by the first wireless node 810, such as in control information associated with a first communication or in an indication to perform the retransmission.

In some aspects, the configuration may indicate a configuration for a retransmission. If the configuration for the retransmission differs from the configuration for the initial transmission of the first communication, the configuration for the retransmission may be referred to herein as a "modified transmission configuration." For example, in some aspects, a configuration for a retransmission of a second communication may be modified relative to a configuration for an initial transmission of a second communication. In some aspects, the configuration for the retransmission may indicate a demodulation reference signal (DMRS) configuration. For example, a DMRS for the retransmission may be modified relative to the initial transmission since a DMRS is a function of time. A modified DMRS may be applicable, for example, where the relay node 815 generates the retransmission using a received codeword (as described with respect to reference number 708), an indication of symbols per antenna (as described with respect to reference number 710), frequency domain IQ samples (as described with respect to reference number 712), or time domain IQ samples (as described with respect to reference number 714).

In some aspects, the configuration may indicate a redundancy version of the retransmission. For example, the configuration may explicitly indicate the redundancy version for the retransmission. As another example, the configuration may indicate a rule for the relay node 815 to use to determine the redundancy version for the retransmission. A modified redundancy version may be applicable, for example, where the relay node 815 generates the retransmission using a received transport block (as described at reference number 706).

In some aspects, the configuration may indicate one or more of a modulation order, a layer mapping configuration, or a precoder. For example, one or more of the modulation order, the layer mapping configuration, or the precoder of the retransmission may be modified relative to the initial transmission. A modified modulation order, layer mapping configuration, or precoder may be applicable, for example, where the relay node generates the retransmission using a received transport block (as described at reference number 706) or frequency domain IQ samples (as described at reference number 712).

In some aspects, the configuration may indicate one or more of a digital beamforming configuration or a resource element mapping configuration (that is, a resource allocation configuration) for the retransmission. For example, one or more of the digital beamforming configuration or the resource element mapping configuration of the retransmission may be modified relative to the initial transmission. A modified digital beamforming configuration or a resource element mapping configuration may be applicable, for example, where the relay node generates the retransmission using a received transport block (as described with respect to reference number 706) or frequency domain IQ samples (as described with respect to reference number 712).

In some aspects, the configuration may indicate one or more of a subcarrier spacing or a cyclic prefix for the retransmission. For example, one or more of the subcarrier spacing or the cyclic prefix of the retransmission may be modified relative to the initial transmission. A modified subcarrier spacing or cyclic prefix may be applicable, for example, where the relay node generates the retransmission using a received transport block (as described with respect to reference number 706), frequency domain IQ samples (as described with respect to reference number 712), a received codeword (as described with respect to reference number 708), or an indication of symbols per antenna (as described with respect to reference number 710).

In some aspects, the configuration may indicate an analog transmit beam for the retransmission. For example, the analog transmit beam for the retransmission may be modified relative to the initial transmission.

In some aspects, one or more of the configurations described herein can be determined by the control node 805 and configured for one or more of the first wireless node 810, the relay node 815, or the second wireless node 820. In some other aspects, the control node 805 may configure instructions used by the first wireless node 810, the relay node 815, or the second wireless node 820 to determine one or more of the configurations. In still other aspects, the first wireless node 810 may determine one or more of the configurations, and may signal the one or more determined configurations to the relay node 815. For example, the first wireless node 810 may signal how to modify a configuration of an initial transmission for a retransmission. As another example, the first wireless node 810 may explicitly signal an updated configuration for the retransmission.

As shown by reference number 835, the control node 805 may provide the configuration to one or more of the first wireless node 810, the relay node 815, or the second wireless node 820. For example, the control node 805 may provide the configuration via radio resource control (RRC) signaling, a control interface, downlink control information, medium access control signaling, or other forms of signaling.

As shown by reference number 840, the first wireless node 810 may transmit a first communication. The first communication may carry a payload destined for a target node, which may be the second wireless node 820 or may be a node (such as a UE) downstream from the second wireless node 820. In some aspects, the first wireless node 810 may transmit a fronthaul physical downlink control channel (FH-PDCCH) via a fronthaul interface between the first wireless node 810 and the relay node 815. The FH-PDCCH may carry control information that schedules a fronthaul physical downlink shared channel (FH-PDSCH) to be received by the relay node 815. One or more of the FH-PDCCH and the FH-PDSCH may be referred to as the first communication. In some aspects, the FH-PDCCH may be referred to as being transmitted prior to the first communication (such as where the first communication includes the FH-PDSCH). The FH-PDSCH may carry information indicating a second communication to be transmitted by the relay node, such as a resource for the second communication, control information (such as a PDCCH or a configuration for generating the PDCCH) for the second information, or other information. The FH-PDSCH may also carry the payload. In some aspects, the relay node 815 may transmit an ACK/NACK for the FH-PDSCH (not shown in FIG. 8).

As shown by reference number 845, the relay node 815 may generate a second communication. For example, the relay node 815 may perform the digital processing described in FIGS. 7A and 7B to generate the second communication. The second communication may include one or more of control information (such as a PDCCH scheduling a PDSCH) and a PDSCH carrying the payload. For example, the control information may be received in the FH-PDSCH, or may be generated based on information included in the FH-PDSCH. In some aspects, the relay node 815 may generate the second communication based on the configuration received from the control node 805, such as using one or more parameters indicated by the configuration or a resource indicated by the configuration. In some aspects, the relay node 815 may buffer the first communication or information associated with the first communication for a length of time, such as to support retransmission of the second communication if the initial transmission of the second communication fails.

As shown by reference number 850, the relay node 815 may transmit the second communication. For example, the relay node 815 may transmit the PDCCH and the PDSCH of the second communication. However, the second wireless node 820 may fail to receive the second communication. In some aspects, the second wireless node 820 may fail to receive the PDCCH, in which case the second wireless node 820 may not be aware of the PDSCH and therefore may not provide feedback regarding the second communication. In some other aspects, the second wireless node 820 may successfully receive the PDCCH and fail to decode the PDSCH, in which case the second wireless node may provide a NACK to the relay node 815.

If the second wireless node 820 provides the NACK and the relay node 815 is capable of processing or interpreting the NACK, then the relay node 815 may trigger retransmission, as described in connection with reference number 860. Alternatively, if the relay node 815 does not receive an ACK/NACK from the second wireless node, the relay node 815 may trigger retransmission. If the relay node 815 relays the NACK to the first wireless node 810, the first wireless node 810 may trigger retransmission, as described in connection with reference number 855.

As shown by reference number 855, in some aspects, the first wireless node 810 may determine that the second wireless node 820 failed to receive the second communication. For example, the first wireless node 810 may determine that the second wireless node 820 has not received the second communication (such as based on a forwarded ACK/NACK from the relay node 815, which is not illustrated in FIG. 8). As used herein, "determining that a node failed to receive a communication" can include identifying a failure state of the communication, receiving an indication that the node failed to receive the communication (such as a forwarded ACK/NACK from a relay node), identifying that no ACK/NACK is received in a time window, and so on. Based on determining that the second wireless node 820 failed to receive the second communication, the first wireless node may transmit an indication, shown by reference number 865, to the relay node 815. The indication may indicate to retransmit the second communication. In some aspects, the indication may include an FH-PDCCH. In some aspects, the indication may indicate a resource for the retransmission. In some aspects, the indication may indicate one or more parameters for the retransmission, such as at least one of the aspects of the configuration described in connection with reference number 830. As just one example, the indication may indicate how to modify a DMRS of the initial transmission of the second communication, or may indicate an updated DMRS for the second communication.

In some aspects, the indication may include a PDCCH for use by the relay node 815 to schedule the retransmission. For example, the first wireless node 810 may generate the PDCCH, and may transmit the PDCCH to the relay node 815 to be forwarded to the second wireless node 820.

As shown by reference number 860, in some aspects, the relay node 815 may determine that the second wireless node 820 has not received the second communication. For example, the relay node 815 may be capable of processing the second wireless node 820's feedback. In such a scenario, the relay node 815 may determine that the second wireless node 820 has not received the second communication, and can thereby determine to retransmit the second communication. In some aspects, the relay node 815 may monitor for an indication of whether the second communication was received by the second wireless node 820, and may transmit a retransmission based on a result of the monitoring. For example, if the relay node 815 does not detect feedback from the second wireless node 820 (indicating a missed PDCCH) or detects a NACK from the second wireless node 820 (indicating a failed PDSCH), the relay node 815 may determine to transmit the retransmission.

As shown by reference number 870, the relay node 815 may retransmit the second communication to the second wireless node 820. For example, the relay node 815 may generate a retransmission of the second communication, and may transmit the retransmission. In some aspects, the retransmission may be on a resource indicated by the first wireless node 810 dynamically (such as in a second FH-PDCCH or a first FH-PDCCH associated with the first communication), or on a resource indicated by a configuration of the relay node 815. In some aspects, the retransmission may use one or more different parameters than the initial transmission, which may be indicated by the configuration, the first communication, or an indication to perform the retransmission. In some aspects, the retransmission may include a PDCCH scheduling a PDSCH. For example, the relay node 815 may forward the PDCCH from the first wireless node 810. As another example, the relay node 815 may generate, encode, and transmit the PDCCH to the second wireless node 820. In yet another example, if the second communication is to be repeated without modification in the retransmission (such as in a next transmission time interval after the initial transmission), the relay node 815 may use stored PDCCH content from the initial transmission to generate and transmit a PDCCH for the retransmission.

Figure 9:
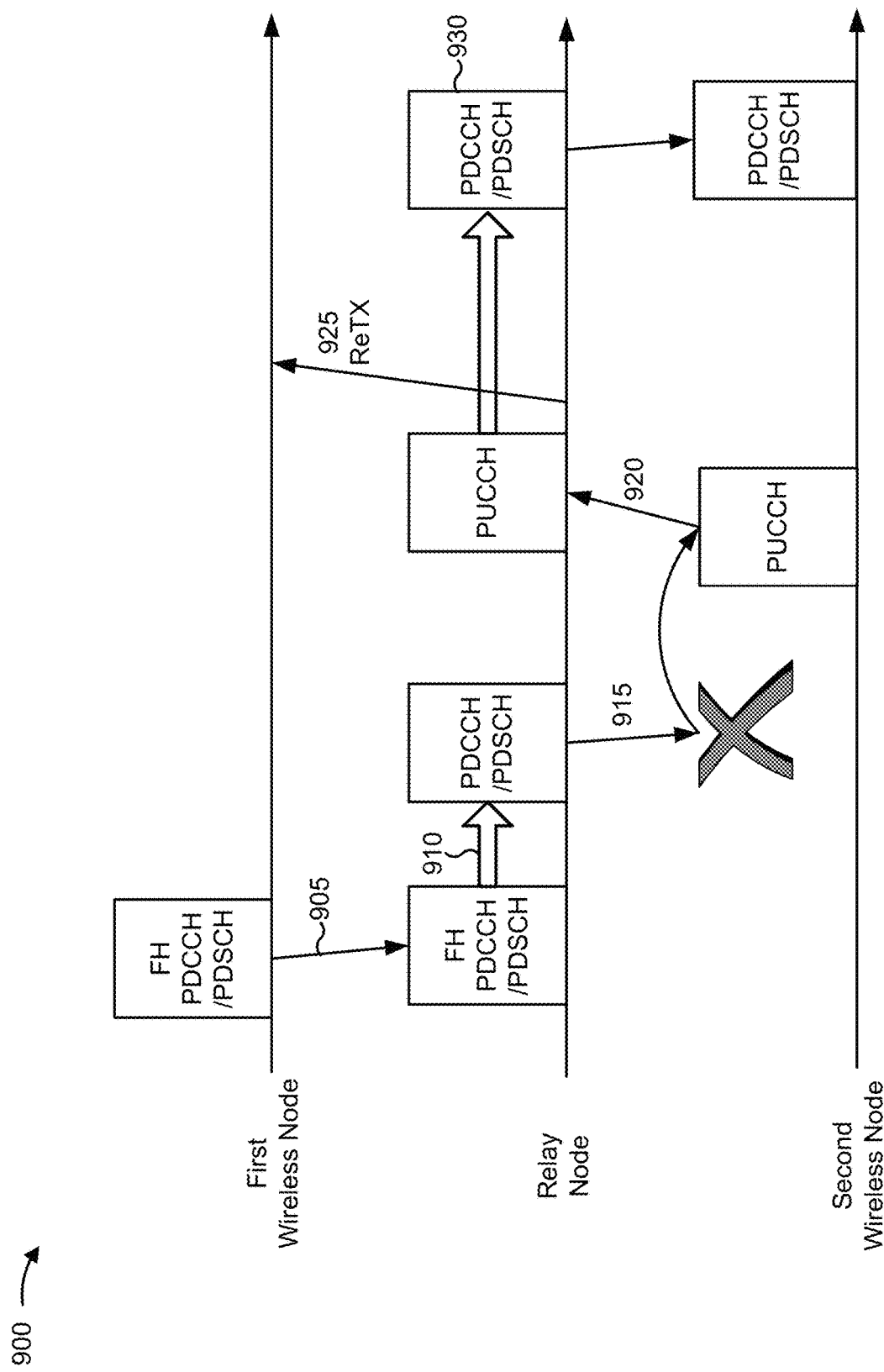
FIG. 9 is a diagram illustrating an example of signaling associated with retransmission of a second communication where the relay node determines to retransmit the second communication.
Figure 10:
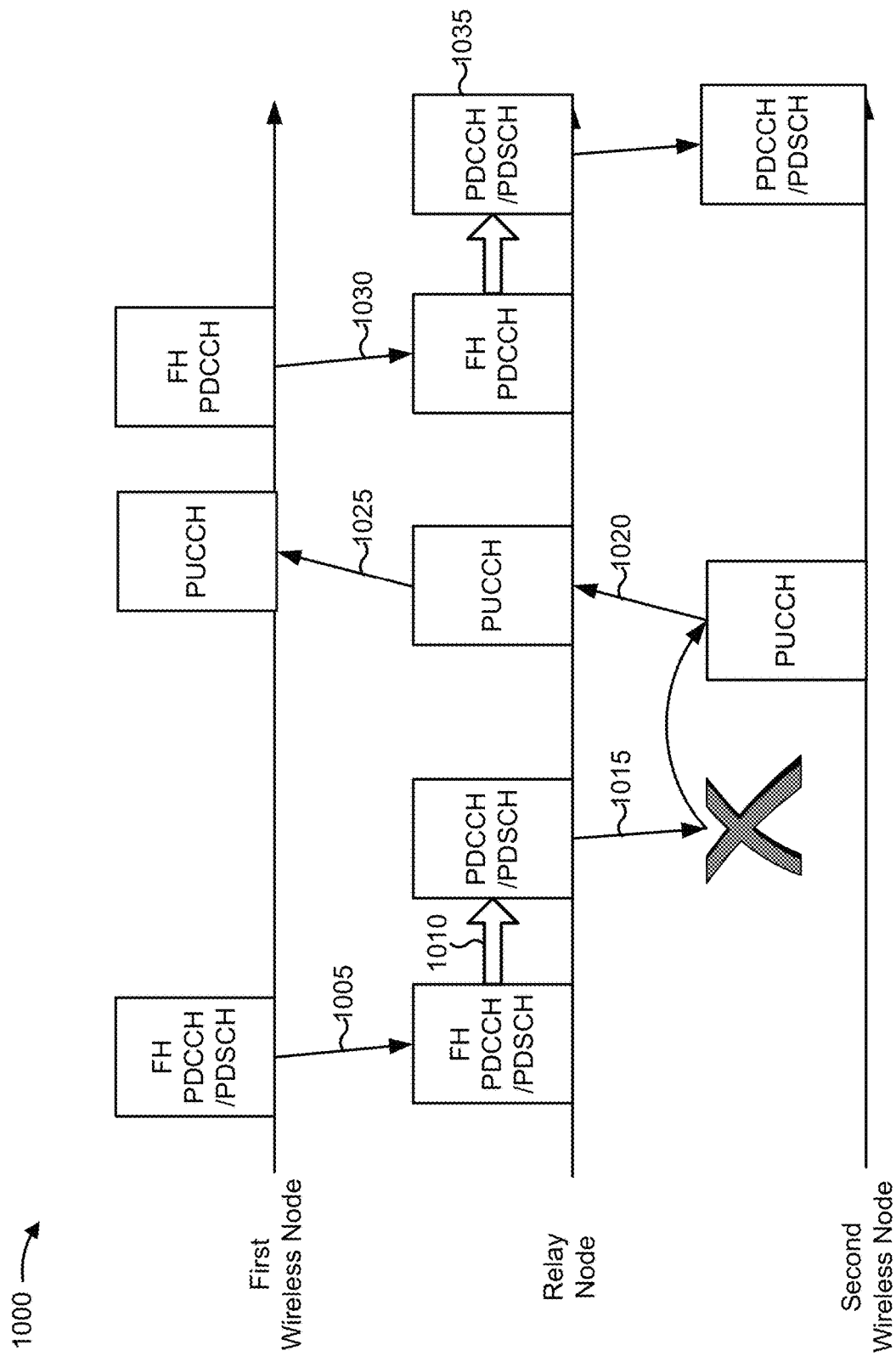
FIG. 10 is a diagram illustrating an example of signaling associated with retransmission of a second communication where the first wireless node determines to retransmit the second communication.

FIG. 9 is a diagram illustrating an example 900 of signaling associated with retransmission of a second communication where the relay node determines to retransmit the second communication. In FIGS. 9 and 10, "FH" denotes a communication via a fronthaul link (such as between a first wireless node and a relay node). For example, "FH PDSCH" indicates a PDSCH transmitted via a fronthaul. Generally, the absence of "FH" in FIGS. 9 and 10 indicates that a communication is via an access link, though it should be understood that the link between the relay node and the second wireless node can be a fronthaul link. For example, "PDSCH" may indicate a PDSCH transmitted via an access link (though it should be understood that this PDSCH can also be transmitted via a fronthaul). As shown, the example 900 includes a first wireless node, a relay node, and a second wireless node, which are described in more detail in connection with FIG. 8.

As shown by reference number 905, the first wireless node may transmit a first communication, including at least one of an FH PDCCH or an FH PDSCH, to the relay node. The relay node may receive the first communication. The first communication as received at the relay node is offset from the first communication as transmitted by the first wireless node to represent delay, such as propagation delay, processing delay, and so on.

As shown by reference number 910, the relay node may generate a second communication based on the first communication. For example, the relay node may generate the second communication for transmission on a resource indicated by the first communication, carrying a payload received via the first communication, and using one or more parameters indicated by information of the first communication. As shown by reference number 915, the relay node may transmit the second communication. However, the second wireless node may fail to receive the second communication, as indicated by the "X." As shown by reference number 920, in some aspects, the second wireless node may transmit an indication of whether the second wireless node has successfully received the second communication. For example, if the second wireless node failed to receive the PDSCH of the second communication, the second wireless node may transmit feedback including an ACK/NACK regarding the second communication via a physical uplink control channel (PUCCH), and the relay node may identify the failure to receive the second communication based on monitoring for and detecting the feedback. If the second wireless node failed to receive the PDCCH of the second communication, then the second wireless node may not transmit feedback, and the relay node may identify the failure to receive the second communication based on monitoring for, and failing to detect, the feedback.

As shown by reference number 925, in some aspects, the relay node may provide an indication of the retransmission of the second communication to the first wireless node. In some aspects, the relay node may provide the indication of the retransmission to a control node (not shown in FIG. 9). As shown by reference number 930, the relay node may perform a retransmission of the second communication. The retransmission of the second communication is described in more detail in connection with FIG. 8.

FIG. 10 is a diagram illustrating an example 1000 of signaling associated with retransmission of a second communication where the first wireless node determines to retransmit the second communication. As shown, the example 1000 includes a first wireless node, a relay node, and a second wireless node, which are described in more detail in connection with FIG. 8.

As shown by reference number 1005, the first wireless node may transmit a first communication, including at least one of an FH PDCCH or an FH PDSCH, to the relay node. The relay node may receive the first communication. The first communication as received at the relay node is offset from the first communication as transmitted by the first wireless node to represent delay, such as propagation delay, processing delay, and so on.

As shown by reference number 1010, the relay node may generate a second communication based on the first communication. For example, the relay node may generate the second communication for transmission on a resource indicated by the first communication, carrying a payload received via the first communication, and using one or more parameters indicated by information of the first communication. As shown by reference number 1015, the relay node may transmit the second communication. However, the second wireless node may fail to receive the second communication, as indicated by the "X." As shown by reference number 1020, in some aspects, the second wireless node may transmit an indication of whether the second wireless node has successfully received the second communication. For example, if the second wireless node failed to receive the PDSCH of the second communication, the second wireless node may transmit feedback including an ACK/NACK regarding the second communication via a PUCCH. The relay node may relay the PUCCH, as shown by reference number 1025. The first wireless node may identify the failure to receive the second communication based on the relayed PUCCH. In some aspects, the first wireless node may identify the failure to receive the second communication based on receiving no feedback regarding the second communication.

As shown by reference number 1030, the first wireless node may trigger retransmission of the second communication. For example, the first wireless node may transmit an FH PDCCH to the relay node. The FH PDCCH may indicate to retransmit the second communication. In some aspects, the FH PDCCH may include one or more parameters for the retransmission, such as a resource for the retransmission, a configuration for the retransmission, or a PDCCH for the relay node to relay in association with the retransmission. In some aspects, the relay node may provide the indication of the retransmission to a control node (not shown in FIG. 10). As shown by reference number 1035, the relay node may perform a retransmission of the second communication. The retransmission of the second communication is described in more detail in connection with FIG. 8.

In this way, by triggering retransmission at the relay node, resources of the first wireless node and the relay node are conserved that would otherwise be used to perform another end-to-end transmission (that is, from the first wireless node to the second wireless node) of the payload. Furthermore, latency is reduced relative to performing end-to-end retransmission.

Figure 11:
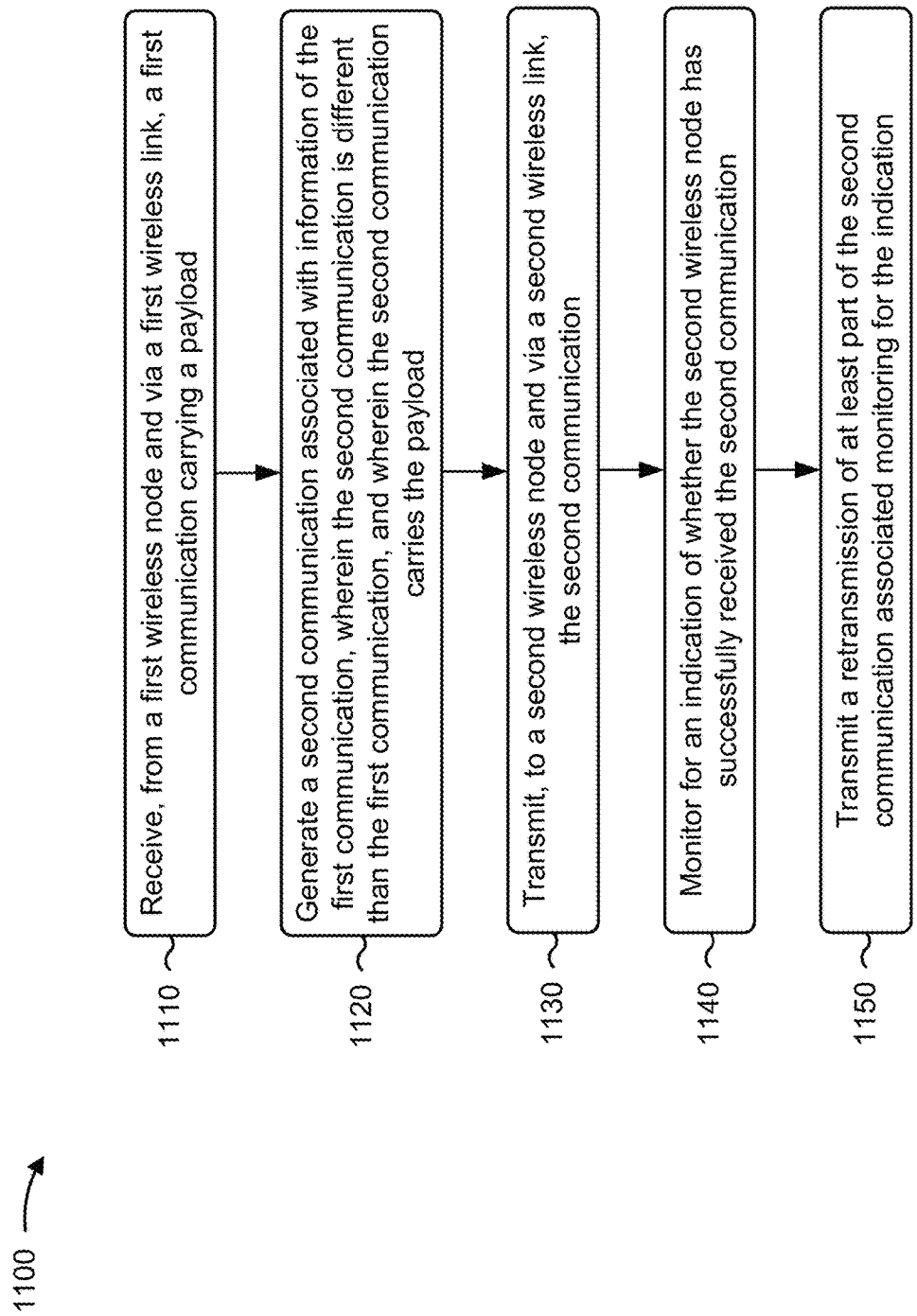
FIGS. 11-13 are diagrams illustrating example processes for efficient retransmission of a communication by a relay node.

FIG. 11 is a diagram illustrating an example process 1100 performed, for example, by a communication device of a relay node (such as base station 110, base station 310, anchor base station 335, non-anchor base station 345, IAB donor 405, TAB node 410, relay node 510, relay node 815, or the relay node of FIGS. 9 and 10). The process 1100 is an example where the communication device (for example, one or more components of the relay node described in connection with FIG. 2 or FIG. 14) performs operations associated with downlink retransmission by a relay node.

As shown in FIG. 11, in some aspects, the process 1100 may include receiving, from a first wireless node and via a first wireless link, a first communication carrying a payload (block 1110). For example, the communication device (such as by using communication manager 1412 or reception component 1402, depicted in FIG. 14) may receive, from a first wireless node and via a first wireless link, a first communication carrying a payload.

As further shown in FIG. 11, in some aspects, the process 1100 may include generating a second communication associated with information of the first communication, where the second communication is different than the first communication, and where the second communication carries the payload (block 1120). For example, the communication device (such as by using communication manager 1412 or generation component 1408, depicted in FIG. 14) may generate a second communication associated with information of the first communication, where the second communication is different than the first communication, and where the second communication carries the payload. In some aspects, the second communication may be generated using digital processing.

As further shown in FIG. 11, in some aspects, the process 1100 may include transmitting, to a second wireless node and via a second wireless link, the second communication (block 1130). For example, the communication device (such as by using communication manager 1412 or transmission component 1404, depicted in FIG. 14) may transmit, to a second wireless node and via a second wireless link, the second communication.

As further shown in FIG. 11, in some aspects, the process 1100 may include monitoring for an indication of whether the second wireless node has successfully received the second communication (block 1140). For example, the communication device (such as by using communication manager 1412 or monitoring component 1410, depicted in FIG. 14) may monitor for an indication of whether the second wireless node has successfully received the second communication.

As further shown in FIG. 11, in some aspects, the process 1100 may include transmitting a retransmission of at least part of the second communication associated monitoring for the indication (block 1150). For example, the communication device (such as by using communication manager 1412 or transmission component 1404, depicted in FIG. 14) may transmit a retransmission of at least part of the second communication associated monitoring for the indication.

The process 1100 may include additional aspects, such as any single aspect or any combination of aspects described in connection with the process 1100 or in connection with one or more other processes described elsewhere herein.

In a first additional aspect, the process 1100 includes relaying, from the second wireless node, feedback indicating whether the second wireless node received the second communication, where the indication of whether the second wireless node has successfully received the second communication is based on the feedback.

In a second additional aspect, alone or in combination with the first aspect, the process 1100 includes transmitting capability information indicating that the relay node is capable of processing feedback indicating whether the second wireless node received the second communication, where receiving the indication further includes receiving, from the second wireless node, the feedback indicating whether the second wireless node received the second communication.

In a third additional aspect, alone or in combination with one or more of the first and second aspects, the process 1100 includes transmitting an indication of the retransmission of at least part of the second communication.

In a fourth additional aspect, alone or in combination with one or more of the first through third aspects, the process 1100 includes receiving information indicating a resource for the retransmission, where the retransmission is on the resource.

In a fifth additional aspect, alone or in combination with one or more of the first through fourth aspects, the information indicating the resource is received via one of a control channel associated with control information for the retransmission or a control channel associated with control information for the second communication.

In a sixth additional aspect, alone or in combination with one or more of the first through fifth aspects, the information indicating the resource is received (that is, obtained) via configuration information.

In a seventh additional aspect, alone or in combination with one or more of the first through sixth aspects, the retransmission uses a modified transmission configuration relative to an initial transmission of the second communication.

In an eighth additional aspect, alone or in combination with one or more of the first through seventh aspects, the modified transmission configuration indicates at least one of a demodulation reference signal configuration, a redundancy version, a modulation order, a layer mapping configuration, a precoder, a digital beamforming configuration, a resource element mapping configuration, a subcarrier spacing, a cyclic prefix, or an analog transmit beam.

In a ninth additional aspect, alone or in combination with one or more of the first through eighth aspects, the process 1100 includes transmitting a control channel carrying control information scheduling the retransmission.

In a tenth additional aspect, alone or in combination with one or more of the first through ninth aspects, the process 1100 includes receiving the control channel via the first wireless link, where transmitting the control channel includes forwarding the control channel.

In an eleventh additional aspect, alone or in combination with one or more of the first through tenth aspects, the process 1100 includes generating the control channel for transmission.

In a twelfth additional aspect, alone or in combination with one or more of the first through eleventh aspects, generating the control channel is based on stored information relating to a control channel associated with the first communication.

Although FIG. 11 shows example blocks of the process 1100, in some aspects, the process 1100 may include additional blocks, fewer blocks, different blocks, or differently arranged blocks than those depicted in FIG. 11. Additionally, or alternatively, two or more of the blocks of the process 1100 may be performed in parallel.

Figure 12:
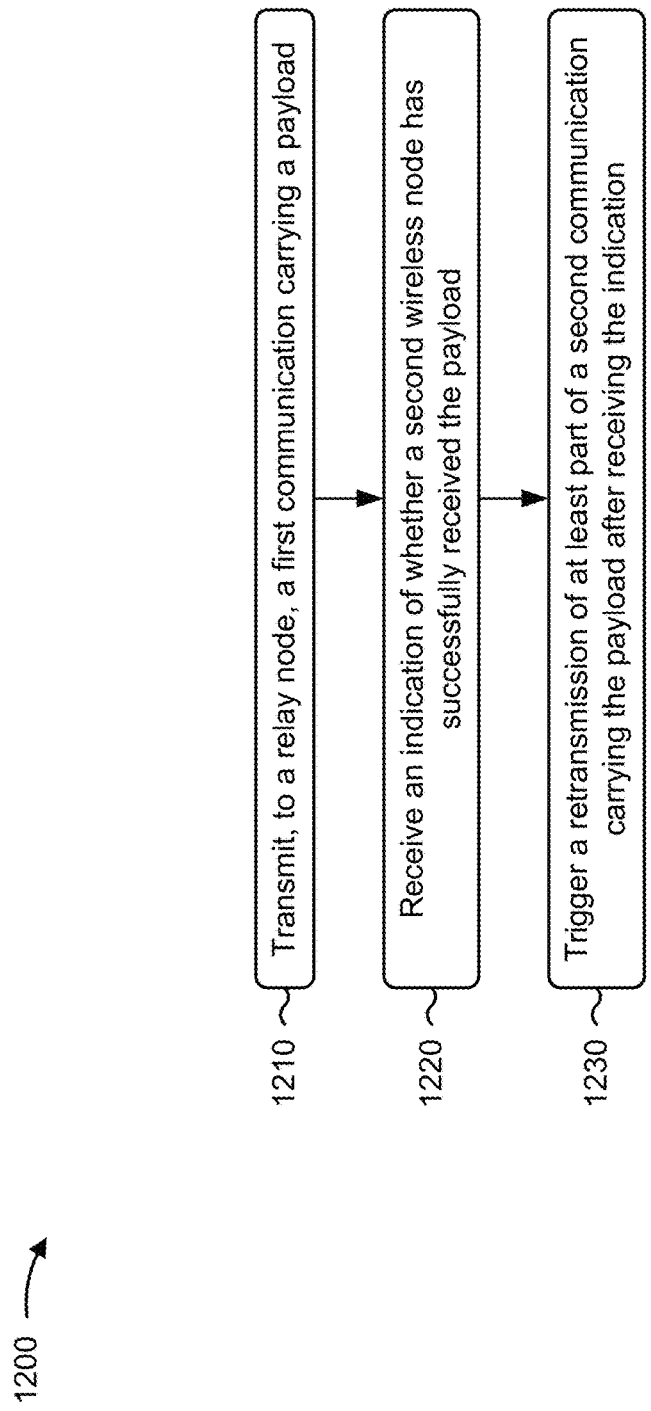

FIG. 12 is a diagram illustrating an example process 1200 performed, for example, by a communication device of a first wireless node (such as base station 110, base station 310, anchor base station 335, non-anchor base station 345, IAB donor 405, IAB node 410, first wireless node 505, first wireless node 810, or the first wireless node of FIGS. 9 and 10). The process 1100 is an example where the communication device (for example, one or more components of the first wireless node described in connection with FIG. 2 or FIG. 15) performs operations associated with downlink retransmission by a relay node.

As shown in FIG. 12, in some aspects, the process 1200 may include transmitting, to a relay node, a first communication carrying a payload (block 1210). For example, the communication device (such as by using communication manager 1510 or transmission component 1504, depicted in FIG. 15) may transmit, to a relay node, a first communication carrying a payload.

As further shown in FIG. 12, in some aspects, the process 1200 may include receiving an indication of whether a second wireless node has successfully received the payload (block 1220). For example, the communication device (such as by using communication manager 1510 or reception component 1502, depicted in FIG. 15) may receive an indication of whether a second wireless node has successfully received the payload.

As further shown in FIG. 12, in some aspects, the process 1200 may include triggering a retransmission of at least part of a second communication carrying the payload after receiving the indication (block 1230). For example, the communication device (such as by using communication manager 1510 or triggering component 1508, depicted in FIG. 15) may trigger a retransmission of at least part of a second communication carrying the payload after receiving the indication.

The process 1200 may include additional aspects, such as any single aspect or any combination of aspects described in connection with the process 1200 or in connection with one or more other processes described elsewhere herein.

In a first additional aspect, the indication includes feedback from the second wireless node regarding the second communication.

In a second additional aspect, alone or in combination with the first aspect, the feedback is relayed to the first wireless node by the relay node.

In a third additional aspect, alone or in combination with one or more of the first and second aspects, triggering the retransmission further includes transmitting an instruction to perform the retransmission.

In a fourth additional aspect, alone or in combination with one or more of the first through third aspects, the process 1200 includes transmitting, prior to transmitting the first communication, control information relating to the first communication, where the control information relating to the first communication relates to configuring the relay node to perform the second communication, and where triggering the retransmission further includes transmitting control information relating to the retransmission.

In a fifth additional aspect, alone or in combination with one or more of the first through fourth aspects, the process 1200 includes transmitting, to the relay node, information indicating a resource for the retransmission or a configuration for the retransmission.

In a sixth additional aspect, alone or in combination with one or more of the first through fifth aspects, the process 1200 includes transmitting, prior to transmitting the first communication, control information relating to the first communication, where the control information relating to the first communication indicates a resource for the retransmission or a configuration for the retransmission.

In a seventh additional aspect, alone or in combination with one or more of the first through sixth aspects, the process 1200 includes transmitting configuration information to the relay node, where the configuration information indicates a resource for the retransmission or a configuration for the retransmission.

In an eighth additional aspect, alone or in combination with one or more of the first through seventh aspects, the retransmission uses a modified transmission configuration relative to an initial transmission of the second communication.

In a ninth additional aspect, alone or in combination with one or more of the first through eighth aspects, the modified transmission configuration indicates at least one of a demodulation reference signal configuration, a redundancy version, a modulation order, a layer mapping configuration, a precoder, a digital beamforming configuration, a resource element mapping configuration, a subcarrier spacing, a cyclic prefix, or an analog transmit beam.

In a tenth additional aspect, alone or in combination with one or more of the first through ninth aspects, the process 1200 includes transmitting, to the relay node, a control channel for the retransmission, where the control channel is for the relay node to schedule the retransmission at the second wireless node.

In an eleventh additional aspect, alone or in combination with one or more of the first through tenth aspects, the process 1200 includes receiving capability information regarding the relay node, where at least one of the indication or triggering the retransmission is based on the capability information.

Although FIG. 12 shows example blocks of the process 1200, in some aspects, the process 1200 may include additional blocks, fewer blocks, different blocks, or differently arranged blocks than those depicted in FIG. 12. Additionally, or alternatively, two or more of the blocks of the process 1200 may be performed in parallel.

Figure 13:
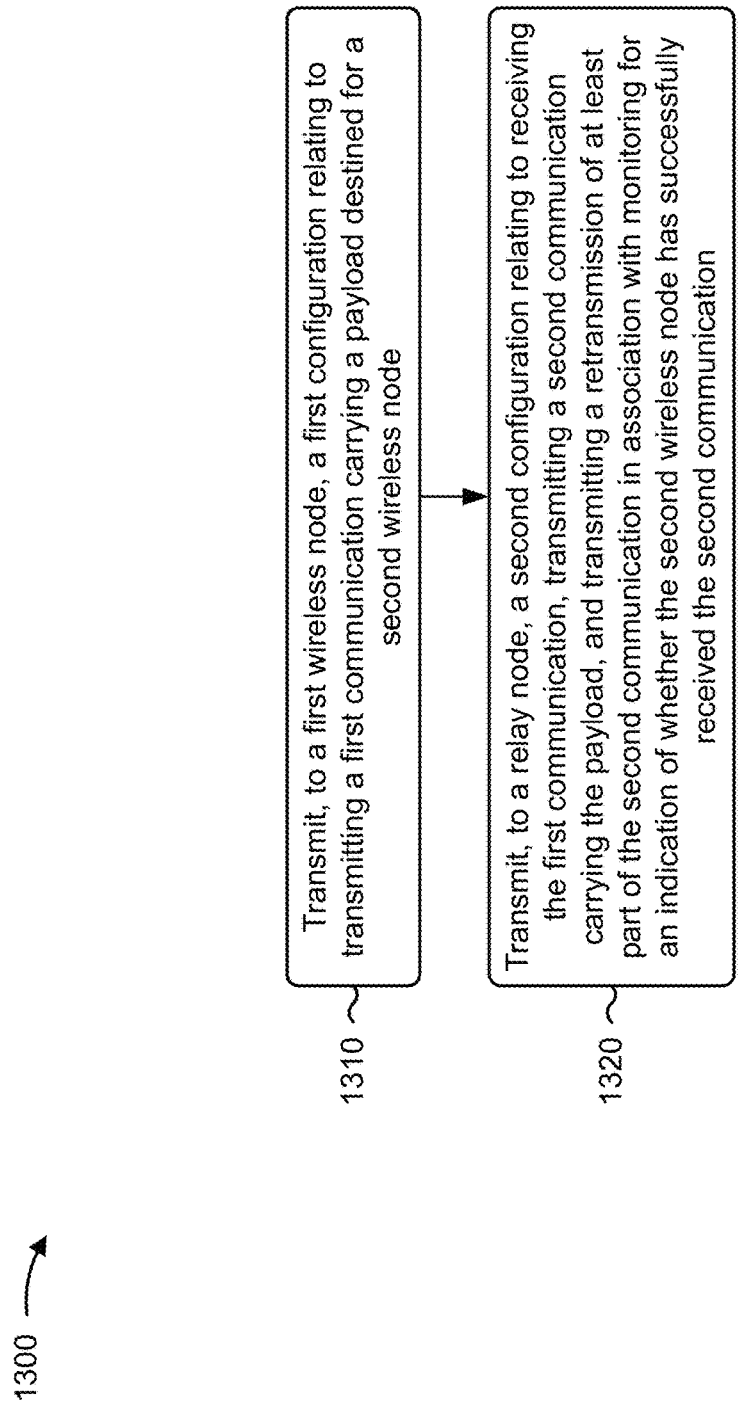

FIG. 13 is a diagram illustrating an example process 1300 performed, for example, by a communication device of a control node (such as base station 110, base station 310, anchor base station 335, non-anchor base station 345, IAB donor 405, a CU of IAB donor 405, IAB node 410, first wireless node 505, a CU of first wireless node 505, control node 805, or a CU associated with the first wireless node of FIGS. 9 and 10). The process 1100 is an example where the communication device (for example, one or more components of the control node described in connection with FIG. 2 or FIG. 16) performs operations associated with downlink retransmission by relay node.

As shown in FIG. 13, in some aspects, the process 1300 may include transmitting, to a first wireless node, a first configuration relating to a first communication carrying a payload (block 1310). For example, the communication device (such as by using communication manager 1610, configuration component 1608, or transmission component 1604, depicted in FIG. 16) may transmit, to a first wireless node, a first configuration relating to a first communication carrying a payload.

As further shown in FIG. 13, in some aspects, the process 1300 may include transmitting, to a relay node, a second configuration relating to: receiving the first communication, transmitting a second communication carrying the payload, and transmitting a retransmission of at least part of the second communication in association with monitoring for an indication of whether a second wireless node has successfully received the second communication (block 1320). For example, the communication device (such as by using communication manager 1610, configuration component 1608, or transmission component 1604, depicted in FIG. 16) may transmit, to a relay node, a second configuration relating to: receiving the first communication, transmitting a second communication carrying the payload, and transmitting a retransmission of at least part of the second communication in association with monitoring for an indication of whether a second wireless node has successfully received the second communication.

The process 1300 may include additional aspects, such as any single aspect or any combination of aspects described in connection with the process 1300 or in connection with one or more other processes described elsewhere herein.

In a first additional aspect, the indication includes feedback from the second wireless node regarding the second communication.

In a second additional aspect, alone or in combination with the first aspect, the process 1300 includes triggering the retransmission using an instruction to perform the retransmission.

In a third additional aspect, alone or in combination with one or more of the first and second aspects, the first configuration includes control information relating to configuring the relay node to perform the second communication, and where triggering the retransmission further includes transmitting control information relating to the retransmission.

In a fourth additional aspect, alone or in combination with one or more of the first through third aspects, the second configuration includes information indicating a resource for the retransmission or a configuration for the retransmission.

In a fifth additional aspect, alone or in combination with one or more of the first through fourth aspects, the first configuration includes control information indicating a resource for the retransmission or a configuration for the retransmission.

In a sixth additional aspect, alone or in combination with one or more of the first through fifth aspects, the process 1300 includes transmitting configuration information to the relay node, where the configuration information indicates a resource for the retransmission or a configuration for the retransmission.

In a seventh additional aspect, alone or in combination with one or more of the first through sixth aspects, the retransmission uses a modified transmission configuration relative to an initial transmission of the second communication.

In an eighth additional aspect, alone or in combination with one or more of the first through seventh aspects, the modified transmission configuration indicates at least one of a demodulation reference signal configuration, a redundancy version, a modulation order, a layer mapping configuration, a precoder, a digital beamforming configuration, a resource element mapping configuration, a subcarrier spacing, a cyclic prefix, or an analog transmit beam.

In a ninth additional aspect, alone or in combination with one or more of the first through eighth aspects, the process 1300 includes receiving capability information regarding the relay node, where at least one of the first configuration or the second configuration is based on the capability information.

Although FIG. 13 shows example blocks of the process 1300, in some aspects, the process 1300 may include additional blocks, fewer blocks, different blocks, or differently arranged blocks than those depicted in FIG. 13. Additionally, or alternatively, two or more of the blocks of the process 1300 may be performed in parallel.

Figure 14:
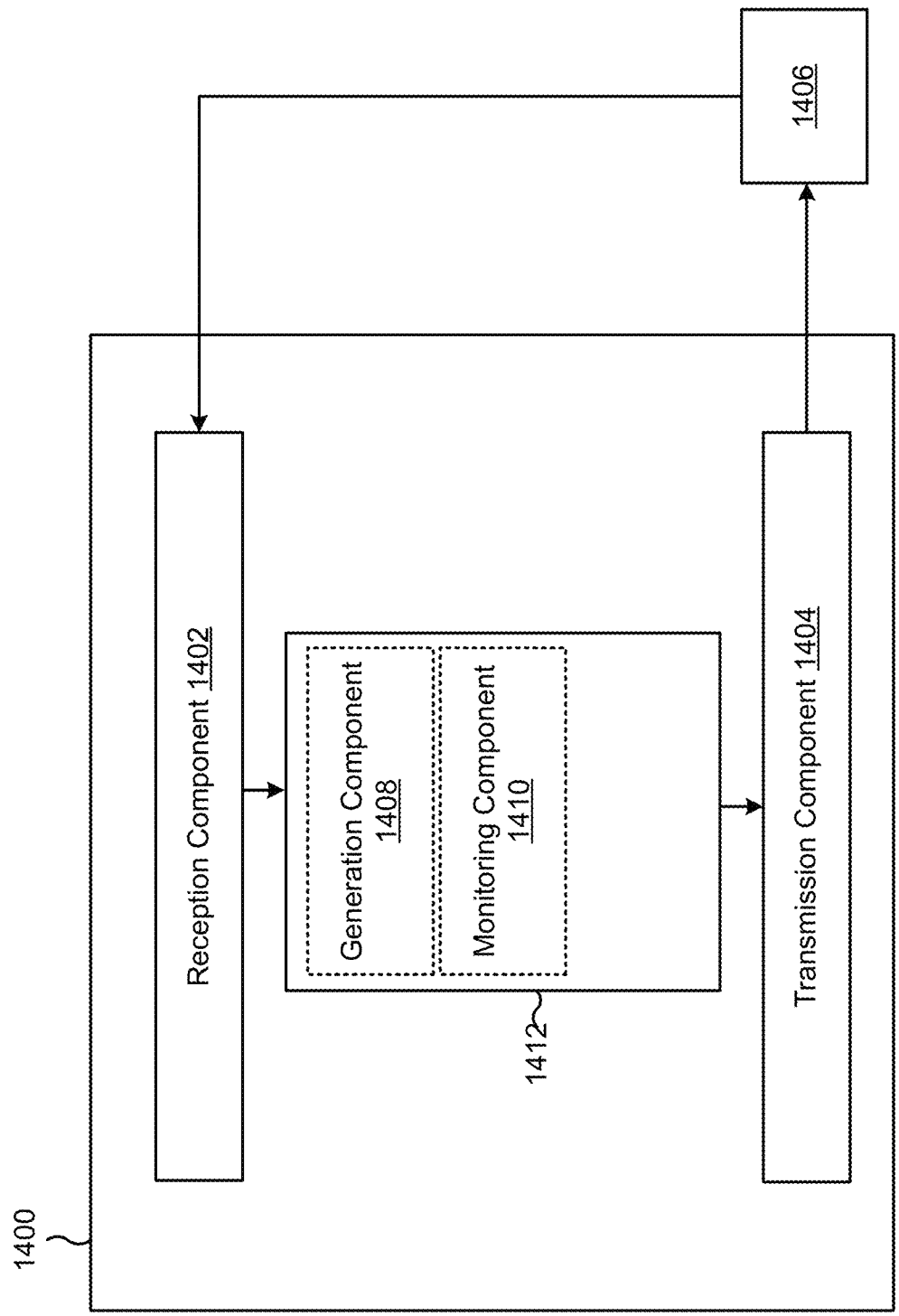
FIGS. 14-16 are block diagrams of example apparatuses for wireless communication.

FIG. 14 is a block diagram of an example apparatus 1400 for wireless communication. The apparatus 1400 may be a relay node, or a relay node may include the apparatus 1400. In some aspects, the apparatus 1400 includes a reception component 1402 and a transmission component 1404, which may be in communication with one another (for example, via one or more buses or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a communication manager 1412 with one or more of a generation component 1408 or a monitoring component 1410, among other examples.

In some aspects, the apparatus 1400 may be configured to perform one or more operations described herein in connection with FIGS. 3 through 10.

Additionally, or alternatively, the apparatus 1400 may be configured to perform one or more processes described herein, such as process 1100 of FIG. 11, or a combination thereof. In some aspects, the apparatus 1400 or one or more components shown in FIG. 14 may include one or more components of the relay node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the relay node described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the relay node described in connection with FIG. 2. In some aspects, the transmission component 1404 may be co-located with the reception component 1402 in a transceiver.

The reception component 1402 may receive, from a first wireless node and via a first wireless link, a first communication carrying a payload. The generation component 1408 may generate a second communication associated with information of the first communication, where the second communication is different than the first communication, and where the second communication carries the payload. The transmission component 1404 may transmit, to a second wireless node and via a second wireless link, the second communication. The monitoring component 1410 may monitor for an indication of whether the second wireless node has successfully received the second communication. The transmission component 1404 may transmit a retransmission of at least part of the second communication associated monitoring for the indication.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
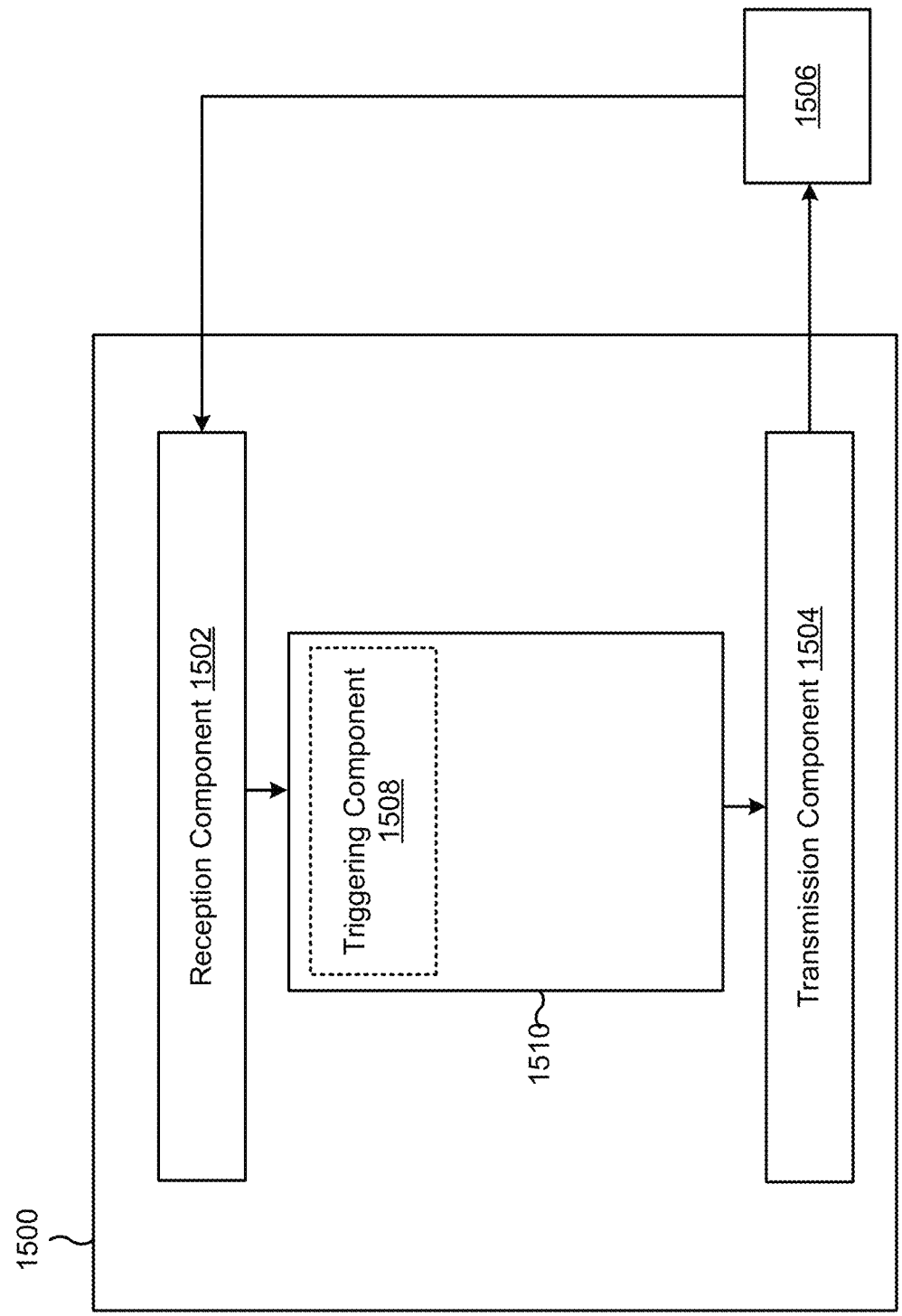

FIG. 15 is a block diagram of an example apparatus 1500 for wireless communication. The apparatus 1500 may be a first wireless node, or a first wireless node may include the apparatus 1500. In some aspects, the apparatus 1500 includes a reception component 1502 and a transmission component 1504, which may be in communication with one another (for example, via one or more buses or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a communication manager 1510 that includes a triggering component 1508, among other examples.

In some aspects, the apparatus 1500 may be configured to perform one or more operations described herein in connection with FIGS. 3 through 10. Additionally, or alternatively, the apparatus 1500 may be configured to perform one or more processes described herein, such as process 1200 of FIG. 12, or a combination thereof. In some aspects, the apparatus 1500 or one or more components shown in FIG. 15 may include one or more components of the first wireless node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the first wireless node described in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the first wireless node described in connection with FIG. 2. In some aspects, the transmission component 1504 may be co-located with the reception component 1502 in a transceiver.

The transmission component 1504 may transmit, to a relay node, a first communication carrying a payload. The reception component 1502 may receive an indication of whether a second wireless node has successfully received the payload. The triggering component 1508 may trigger a retransmission of at least part of a second communication carrying the payload after receiving the indication.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
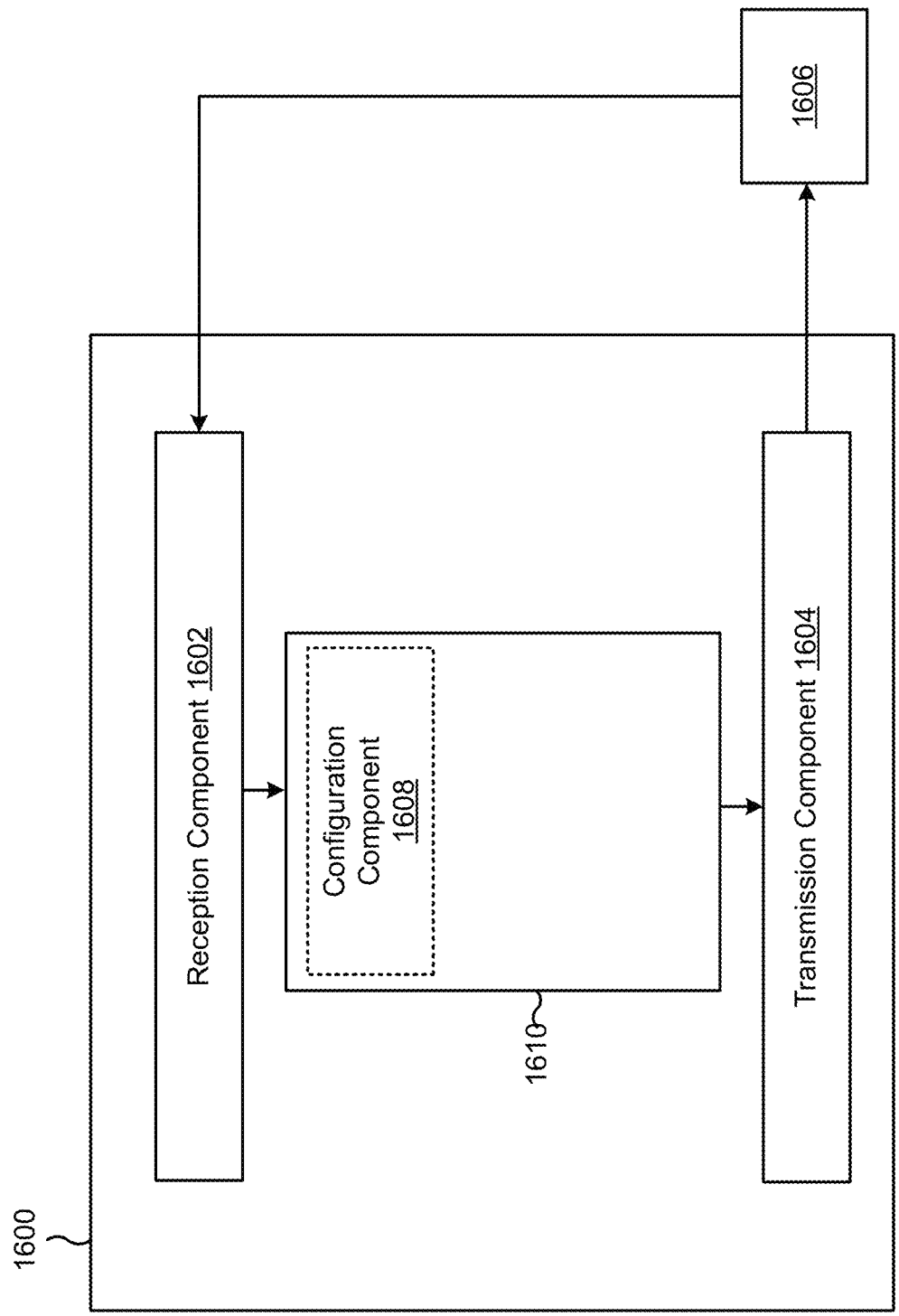

FIG. 16 is a block diagram of an example apparatus 1600 for wireless communication. The apparatus 1600 may be a control node, or a control node may include the apparatus 1600. In some aspects, the apparatus 1600 includes a reception component 1602 and a transmission component 1604, which may be in communication with one another (for example, via one or more buses or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a communication manager 1610 including a configuration component 1608, among other examples.

In some aspects, the apparatus 1600 may be configured to perform one or more operations described herein in connection with FIGS. 3 through 10. Additionally, or alternatively, the apparatus 1600 may be configured to perform one or more processes described herein, such as process 1300 of FIG. 13, or a combination thereof. In some aspects, the apparatus 1600 or one or more components shown in FIG. 16 may include one or more components of the control node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the control node described in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the control node described in connection with FIG. 2. In some aspects, the transmission component 1604 may be co-located with the reception component 1602 in a transceiver.

The transmission component 1604 or the configuration component 1608 may transmit, to a first wireless node, a first configuration relating to a first communication carrying a payload. The transmission component 1604 or the configuration component 1608 may transmit, to a relay node, a second configuration relating receiving the first communication, transmitting a second communication carrying the payload, and transmitting a retransmission of at least part of the second communication in association with monitoring for an indication of whether a second wireless node has successfully received the second communication.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The foregoing disclosure provides illustration and description, but is not intended to be exhaustive or to limit the aspects to the precise forms disclosed. Modifications and variations may be made in light of the disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying" a threshold may refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a-b, a-c, b-c, and a-b-c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A communication device of a relay node for wireless communication, comprising:
   one or more interfaces configured to output, prior to obtaining a first communication from a first wireless node, capability information indicating that the relay node is capable of processing feedback indicating that a second wireless node has not received a second communication;
   the one or more interfaces configured to obtain, from the first wireless node and via a first wireless link, the first communication carrying a payload;
   a processing system configured to generate the second communication associated with information of the first communication, wherein the second communication is different than the first communication, and wherein the second communication carries the payload;
   the one or more interfaces configured to output, to the second wireless node and via a second wireless link, the second communication;
   the processing system further configured to receive an indication that the second wireless node has not successfully received the second communication; and
   the one or more interfaces configured to output, based at least in part on a buffer of the communication device of the relay node, a retransmission of at least part of the second communication based at least in part on receiving the indication,
   the one or more interfaces, when receiving the indication, are configured to obtain, from the second wireless node, the feedback indicating that the second wireless node has not received the second communication.

2. The communication device of claim 1, wherein the processing system is further configured to:
   relay, from the second wireless node, the feedback indicating that the second wireless node has not received the second communication, wherein the indication that the second wireless node has not successfully received the second communication is based on the feedback.

3. The communication device of claim 1, wherein the one or more interfaces are further configured to: output an indication of the retransmission of at least part of the second communication.

4. The communication device of claim 1, wherein the one or more interfaces are further configured to:
   obtain information indicating a resource for the retransmission, wherein the retransmission is on the resource.

5. The communication device of claim 4, wherein the information indicating the resource is obtained via one of a control channel associated with control information for the retransmission or a control channel associated with control information for the second communication.

6. The communication device of claim 4, wherein the information indicating the resource is obtained via configuration information.

7. The communication device of claim 1, wherein the retransmission uses a modified transmission configuration relative to an initial transmission of the second communication.

8. The communication device of claim 7, wherein the modified transmission configuration indicates at least one of:
   a demodulation reference signal configuration,
   a redundancy version,
   a modulation order,
   a layer mapping configuration,
   a precoder,
   a digital beamforming configuration,
   a resource element mapping configuration,
   a subcarrier spacing,
   a cyclic prefix, or
   an analog transmit beam.

9. The communication device of claim 1, wherein the one or more interfaces are further configured to:
   output a control channel carrying control information scheduling the retransmission.

10. The communication device of claim 9, wherein the one or more interfaces are further configured to:
    obtain the control channel via the first wireless link, wherein transmitting the control channel comprises forwarding the control channel.

11. The communication device of claim 9, wherein the processing system is further configured to:
    generate the control channel for transmission.

12. The communication device of claim 11, wherein generating the control channel is based on stored information relating to a control channel associated with the first communication.

13. A communication device of a first wireless node for wireless communication, comprising:
    one or more interfaces configured to output, prior to outputting a first communication, control information relating to the first communication, wherein the control information relating to the first communication relates to configuring a relay node to perform a second communication;
    the one or more interfaces configured to output, to the relay node, the first communication carrying a payload;
    the one or more interfaces configured to obtain an indication that a second wireless node has not successfully received the payload; and
    a processing system configured to trigger, based at least in part on a buffer of the communication device, a retransmission of at least part of the second communication carrying the payload after receiving the indication, wherein triggering the retransmission further comprises transmitting control information relating to the retransmission.

14. The communication device of claim 13, wherein the indication comprises feedback from the second wireless node regarding the second communication.

15. The communication device of claim 13, wherein the one or more interfaces are configured to output an instruction to perform the retransmission.

16. The communication device of claim 13, wherein the one or more interfaces are further configured to:
output, to the relay node, information indicating a resource for the retransmission or a configuration for the retransmission.

17. The communication device of claim 13, wherein the one or more interfaces are further configured to:
output configuration information to the relay node, wherein the configuration information indicates a resource for the retransmission or a configuration for the retransmission.

18. The communication device of claim 13, wherein the one or more interfaces are further configured to:
output, to the relay node, a control channel for the retransmission, wherein the control channel is for the relay node to schedule the retransmission at the second wireless node.

19. A communication device of a control node for wireless communication, comprising:
one or more interfaces configured to:
output, to a first wireless node, a first configuration relating to a first communication carrying a payload;
output, to a relay node, a second configuration relating to:
obtaining the first communication,
outputting a second communication carrying the payload, and
outputting, based at least in part on a buffer of a communication device of the relay node, a retransmission of at least part of the second communication based at least in part on receiving an indication that a second wireless node has not successfully received the second communication; and
obtain capability information regarding the relay node, wherein at least one of the first configuration or the second configuration is based on the capability information.

20. The communication device of the control node of claim 19, wherein the indication comprises the feedback from the second wireless node regarding the second communication.

21. The communication device of the control node of claim 19, further comprising a processing system configured to:
trigger the retransmission using an instruction to perform the retransmission.

22. The communication device of the control node of claim 19, wherein the second configuration includes information indicating a resource for the retransmission or a configuration for the retransmission.

23. The communication device of the control node of claim 19, wherein the first configuration includes control information indicating a resource for the retransmission or a configuration for the retransmission.

24. The communication device of the control node of claim 19, wherein the one or more interfaces are further configured to:
output configuration information to the relay node, wherein the configuration information indicates a resource for the retransmission or a configuration for the retransmission.

25. A method performed by a communication device of a relay node, comprising:
transmitting, prior to receiving a first communication from a first wireless node, capability information indicating that the relay node is capable of processing feedback indicating that a second wireless node has not received a second communication;
receiving, from the first wireless node and via a first wireless link, the first communication carrying a payload;
generating the second communication associated with information of the first communication, wherein the second communication is different than the first communication, and wherein the second communication carries the payload;
transmitting, to the second wireless node and via a second wireless link, the second communication;
receiving an indication that the second wireless node has not successfully received the second communication, wherein receiving the indication further comprises receiving, from the second wireless node, the feedback indicating that the second wireless node has not received the second communication; and
transmitting, based at least in part on a buffer of the communication device of the relay node, a retransmission of at least part of the second communication based at least in part on receiving the indication.

26. The method of claim 25, further comprising:
relaying, from the second wireless node, the feedback indicating that the second wireless node has not received the second communication, wherein the indication that the second wireless node has not successfully received the second communication is based on the feedback.

* * * * *